(12) United States Patent  
Singh et al.

(10) Patent No.: US 12,184,628 B2  
(45) Date of Patent: Dec. 31, 2024

(54) CLOUD-BASED SHARING OF DIGITAL KEYS

(71) Applicant: EVQ TECHNOLOGIES PRIVATE LIMITED, Gurugram (IN)

(72) Inventors: Arjun Singh, Gurugram (IN); Martin Griffith, Bedford (CA); Mario Landau Holdsworth, Gurugram (IN); Gangadhara Gopi, Prakasam (IN)

(73) Assignee: EVQ TECHNOLOGIES PRIVATE LIMITED, Gurugram (IN)

( * ) Notice: Subject to any disclaimer, the term of this patent is extended or adjusted under 35 U.S.C. 154(b) by 258 days.

(21) Appl. No.: 17/808,341

(22) Filed: Jun. 23, 2022

(65) Prior Publication Data

US 2022/0417228 A1    Dec. 29, 2022

(51) Int. Cl.  
    *H04L 29/06*    (2006.01)  
    *H04L 9/40*    (2022.01)

(52) U.S. Cl.  
    CPC .......... *H04L 63/062* (2013.01); *H04L 63/061* (2013.01); *H04L 63/101* (2013.01); *H04L 63/20* (2013.01)

(58) Field of Classification Search  
    CPC ...... H04L 63/062; H04L 63/061; H04L 63/20  
    See application file for complete search history.

(56) References Cited

U.S. PATENT DOCUMENTS

| 10,382,412 | B2 | 8/2019 | Fujiwara et al. |
| 2014/0129113 | A1* | 5/2014 | Van Wiemeersch .... F02D 28/00 701/1 |
| 2018/0326947 | A1* | 11/2018 | Oesterling ............ B60R 25/241 |
| 2019/0375373 | A1* | 12/2019 | Pepe ................ H04M 1/724098 |
| 2020/0079322 | A1 | 3/2020 | Crocker et al. |
| 2020/0099522 | A1* | 3/2020 | Yang ...................... H04L 9/3226 |
| 2021/0168602 | A1 | 6/2021 | Kim et al. |

OTHER PUBLICATIONS

Flinkey, https://www.flinkey.com/en/.  
MoboKey, https://mobokey.com/how-to-install-mobokey-cam-pro-in-turn-key-start-car/.  
Examination report for application No. 202111028396, pp. 5, mailed on Apr. 13, 2023.  
Wei et al."HIBS-KSharing: Hierarchical Identity-Based Signature Key Sharing for Automotive"; Publication Date: Aug. 21, 2017; DOI: https://doi.org/10.1109/ACCESS.2017.2737957.

* cited by examiner

Primary Examiner — Jason K Gee  
(74) Attorney, Agent, or Firm — CHIP LAW GROUP

(57) ABSTRACT

A system for managing an access to an asset is provided. A digital key to the asset is generated and synchronized between a first user device of a first user and an access control device that controls the access to the asset. A key-sharing request is initiated by the first user device to grant a second user the access to the asset. Based on the key-sharing request, an application server communicates the digital key to a second user device of the second user. When the second user device is within a detection range of the access control device, the access control device receives the digital key from the second user device, validates the digital key, and grants the second user the access to the asset for an access duration defined in the key-sharing request.

20 Claims, 11 Drawing Sheets

CLOUD-BASED SHARING OF DIGITAL KEYS

CROSS-REFERENCE TO RELATED APPLICATIONS/INCORPORATION BY REFERENCE

This patent application refers to, claims priority to, and claims the benefit of Indian provisional application IN202111028396 filed Jun. 24, 2021, the contents of which are hereby incorporated herein by reference in its entirety.

FIELD

Various embodiments of the disclosure relate generally to access management for assets. More specifically, various embodiments of the disclosure relate to methods and systems for cloud-based sharing of digital keys to access assets.

BACKGROUND

Throughout human history, assets such as vehicles, storage facilities, or homes have been secured by way of a lock and a key. Advancements in technology have led to the development of modern security systems for securing these assets. These modern security systems enable users to use digital or virtual keys to access these assets. A digital key is a digital code (e.g., a numeric or alphanumeric code) that may be stored in a user device such as a smartphone or a smartwatch. A security system may allow a user to access an asset (e.g., a vehicle) when a correct digital key is presented by the user device to the security system. For example, modern-day vehicles are supplied with smart key fobs. A smart key fob may communicate with a security system in a vehicle to automatically unlock the doors of the vehicle when a user, carrying the smart key fob, is near the vehicle. When near the vehicle, the smart key fob communicates a corresponding digital key to the security system in the vehicle, prompting the security system to unlock the doors of the vehicle.

In many situations, a user may intend to allow another user to temporarily access an asset. For example, a user may want to allow an acquaintance to briefly enter his vehicle to retrieve an item. Similarly, the user may want to allow a plumber to enter his house to perform repairs. If the user is present at a location close to the asset, the user may be available to unlock the asset for access by other users. However, if the user is at a location away from the asset, the user may be unavailable to unlock the asset for other users. One solution is for the user to share the digital key. But this poses significant security risks for the user.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods and systems for cloud-based sharing of digital keys are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
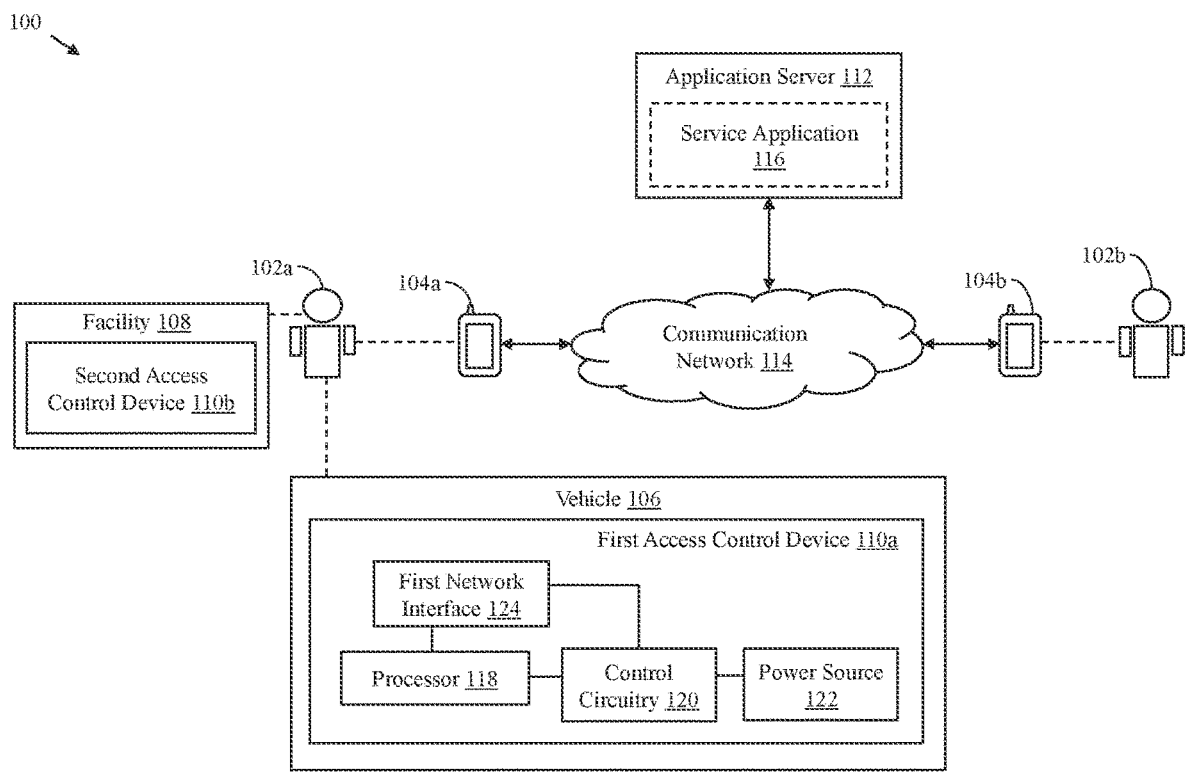
FIG. 1 is a block diagram that illustrates a system environment for facilitating cloud-based sharing of digital keys, in accordance with an exemplary embodiment of the present disclosure.

Certain embodiments of the disclosure may be found in disclosed systems and methods for cloud-based sharing of digital keys. Exemplary aspects of the disclosure provide an access management system that includes a server and an access control device that may be configured to control an access to an asset associated with a first user. The server may be configured to receive, from a first user device of the first user, a key-sharing request to grant a second user, that is different from the first user, the access to the asset. The key-sharing request includes an access duration that is indicative of a time-period for which the asset is to remain accessible to the second user. Based on the key-sharing request, the server may be further configured to determine a digital key associated with the asset and communicate the digital key to a second user device of the second user over a communication network. Based on the second user device being within a detection range of the access control device, the access control device may be configured to receive the digital key from the second user device, validate the digital key, and grant, based on the validation of the digital key, the second user the access to the asset for the access duration.

In some embodiments, the access control device may include a processor, a power source, and control circuitry that may be coupled to the processor and the power source. The processor may be configured to control the access to the asset. The asset is inaccessible when the processor is deactivated. The control circuitry may be configured to receive the digital key from the second user device, validate the digital key, and activate the processor based on the validation of the digital key. The control circuitry activates the processor by coupling the processor to the power source. Further, based on the activation, the processor may be configured to grant the second user the access to the asset. The access to the asset corresponds to unlocking the asset.

In some embodiments, based on the granted access, the control circuitry may be further configured to periodically poll the second user device for the digital key. Based on a halt in the reception of the digital key from the second user device, the control circuitry may be further configured to communicate a shutdown message to the processor. The processor may be further configured to initiate, based on the shutdown message, a shutdown procedure to lock the asset.

In some embodiments, the control circuitry may be further configured to deactivate the processor based on completion of the shutdown procedure. The control circuitry deactivates the processor by decoupling the processor from the power source.

In some embodiments, the asset may include one or more components. The processor may be configured to control functioning of the one or more components of the asset to control the access to the asset. The processor controls the functioning of the one or more components by way of a set of digital keys that is different from the digital key received from the second user device.

In some embodiments, the key-sharing request may further include an access code associated with the first user. The server may be further configured to validate the key-sharing request based on the access code. Further, the server communicates the digital key to the second user device based on the validation of the key-sharing request.

In some embodiments, the key-sharing request may further indicate a time-window during which the access to the asset is to be granted to the second user. The server communicates the digital key to the second user device at a start of the time-window.

In some embodiments, the server may be further configured to communicate an access credentials deletion request to the second user device. The server communicates the access credentials deletion request based on a lapse of the access duration, an access revocation request generated by the first user device to indicate that the access granted to the second user is to be revoked, or a notification generated by the second user device to indicate that the asset is successfully accessed by the second user and a distance between the second user device and the access control device is greater than the detection range after successfully accessing the asset. Based on the access credentials deletion request, the digital key is deleted from the second user device, thereby revoking the access of the second user to the asset.

In some embodiments, the server may be further configured to receive, from the second user device, an extension request to extend the access duration. Further, the server may be configured to present the extension request to the first user by way of the first user device, and receive, from the first user device in response to the extension request, an extension approval message indicating that the extension request is approved. The access duration is updated based on an extension duration indicative of an extended time-period for which the asset is to remain accessible to the second user. The extension duration may be included in the extension request or the extension approval message. The access control device grants the second user the access to the asset for the updated access duration.

In some embodiments, when the access to the asset is granted to the second user, the first user device is beyond the detection range of the access control device.

In some embodiments, based on the digital key, the second user is granted access to the asset in entirety.

In some embodiments, the asset is divided into a plurality of parts. An access to the plurality of parts is controlled by way of a plurality of digital keys, respectively. The key-sharing request may further include an access level indicating that the second user is to be granted access to a first part of the asset. The server may be further configured to select, from the plurality of digital keys based on the access level, the digital key that is associated with the first part of the asset.

In some embodiments, the server may be further configured to communicate a user authentication request to the second user device and receive, as a response to the user authentication request, user authentication data associated with the second user. Further, the server may be configured to validate the user authentication data to authenticate the second user. Based on the validation of the user authentication data, the server communicates the digital key to the second user device or the access control device receives the digital key from the second user device.

In some embodiments, the access control device is further configured to receive, based on an attempt of the second user to access the asset, user authentication data associated with the second user, and validate the user authentication data to authenticate the second user. The access control device grants the second user the access to the asset further based on the validation of the user authentication data.

In some embodiments, the digital key is synchronized between the first user device and the access control device prior to the server receiving the key-sharing request from the first user device based on the first user device being within the detection range of the access control device. The server may be further configured to receive, from the first user device, a first time-stamp indicative of a time-instance at which the digital key is synchronized between the first user device and the access control device and a validity period of the digital key. When the key-sharing request is received, the server may be further configured to determine, based on the validity period and the first time-stamp, a remaining validity of the digital key and compare the access duration with the remaining validity of the digital key. The server communicates the digital key to the second user device based on the remaining validity of the digital key being greater than the access duration by a pre-determined threshold.

In some embodiments, the access control device may be further configured to generate the digital key and synchronize the digital key with the first user device based on the first user device being within the detection range of the access control device. The digital key is synchronized between the first user device and the access control device prior to the server receiving the key-sharing request from the first user device. The server may be further configured to receive the digital key from the first user device as a part of the key-sharing request or when the digital key is synchronized.

In some embodiments, the digital key is generated by the first user device. The access control device may be further configured to receive, based on the first user device being within the detection range of the access control device, the digital key from the first user device to synchronize the digital key therebetween. The digital key is synchronized between the first user device and the access control device prior to the server receiving the key-sharing request from the first user device. The server may be further configured to receive the digital key from the first user device as a part of the key-sharing request or when the digital key is generated by the first user device.

In some embodiments, the server may be further configured to generate the digital key and communicate the digital key to the first user device. The access control device may be further configured to receive, based on the first user device being within the detection range of the access control device, the digital key from the first user device to synchronize the digital key therebetween. The digital key is synchronized between the first user device and the access control device prior to the server receiving the key-sharing request from the first user device.

In some embodiments, the key-sharing request may further include an identifier of the second user. The server may be further configured to determine the second user to whom the access is to be granted and the second user device associated with the second user based on the key-sharing request.

In some embodiments, based on the key-sharing request, the server may be further configured to select the second user and present the selected second user to the first user by way of the first user device. The server may be further configured to receive a user approval message from the first user device indicating that the second user is approved for the access to the asset. Further, the server may be configured to determine the second user device associated with the second user for communicating the digital key.

FIG. 1 is a block diagram that illustrates a system environment 100 for facilitating cloud-based sharing of digital keys, in accordance with an exemplary embodiment of the present disclosure. The system environment 100 includes first and second users 102a and 102b that are associated with first and second user devices 104a and 104b, respectively. Hereinafter, the first and second users 102a and 102b are collectively referred to and designated as "a set of users 102" and the first and second user devices 104a and 104b are collectively referred to and designated as "a set of user devices 104". The system environment 100 further includes a vehicle 106 and a facility 108 that are associated with the first user 102a. Further, the system environment 100 includes first and second access control devices 110a and 110b that control access to the vehicle 106 and the facility 108, respectively, and an application server 112. The first and second access control devices 110a and 110b and the application server 112 correspond to an access management system that manages access to an asset (such as the vehicle 106 and the facility 108).

The application server 112 and the first and second user devices 104a and 104b may communicate by way of a communication network 114. The communication network 114 may include suitable logic, circuitry, interfaces, and/or code, executable by the circuitry, that may be configured to transmit queries, messages, data, and requests between various entities, such as the set of user devices 104 and the application server 112. Examples of the communication network 114 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio-frequency (RF) network, and a combination thereof. Various entities in the system environment 100 may be coupled to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The first user device 104a may include suitable logic, circuitry, interfaces, and/or code, executable by the circuitry, that enables sharing of digital keys associated with various assets (e.g., the vehicle 106 and the facility 108) with other user devices. In other words, the first user device 104a may enable the first user 102a to share (e.g., transmit or receive), with other users (e.g., the second user 102b), digital keys to access various assets. For the sake of brevity, the term "key" refers to digital keys throughout the disclosure. A digital key may be a digital code (e.g., a numeric code, an alphanumeric code, or the like) that grants, a user or a user device, access to an asset (e.g., the vehicle 106 or the facility 108). The first user device 104a may be configured to execute a service application 116, hosted by the application server 112, for a purpose of sharing digital keys. In one embodiment, the service application 116 may be a stand-alone application installed on the first user device 104a. In another embodiment, the service application 116 may be a web-based application that is accessible through a browser application installed on the first user device 104a. Examples of the first user device 104a may include, but are not limited to, smartphones, smartwatches, tablets, phablets, laptops, or the like. It will be apparent to those of skill in the art that the second user device 104b that is associated with the second user 102b may be functionally similar to the first user device 104a. The second user device 104b is also configured to execute the service application 116.

The vehicle 106 is a mode of transport that is utilized by the first user 102a to commute from one location to another location. In one embodiment, the vehicle 106 is privately owned by the first user 102a and may be used for fulfilling self-traveling requirements. In another embodiment, the vehicle 106 may be deployed by a service provider, such as a transport aggregator, to provide on-demand vehicle services to one or more users. The vehicle 106 may include, therein, a plurality of vehicular systems. The plurality of vehicular systems may include, but are not limited to, a door locking/unlocking system, a boot lid locking/unlocking system, a fuel-port lid locking/unlocking system, a charging-port locking/unlocking system, an air-conditioning system, an in-car entertainment system, an electrical system, or the like. The vehicle 106 may be one of an electric vehicle, an internal combustion engine vehicle, a hybrid vehicle, or the like. The vehicle 106 (e.g., the plurality of vehicular systems in the vehicle 106) may be accessed by way of a digital key associated with the vehicle 106. Examples of the vehicle 106 may include, but are not limited to, two-wheelers (e.g., bikes), three-wheelers, four-wheelers (e.g., cars, trucks, buses, or the like). Access to the vehicle 106 is controlled (e.g., regulated) by the first access control device 110a.

The first access control device 110a is a security system that may permit a user to access the vehicle 106 (e.g., access one or more of the plurality of vehicular systems), based on whether the digital key to the vehicle 106 is stored in a user device of the user. The access to the vehicle 106 may correspond to unlocking a set of doors of the vehicle 106, unlocking a boot-lid of the vehicle 106, or the like. The first access control device 110a may be installed at various locations in the vehicle 106. For example, the first access control device 110a may be installed on top of a dashboard in the vehicle 106, within the dashboard, on an inside portion of a door of the vehicle 106, on an outside portion of a door of the vehicle 106, or the like.

The first access control device 110a may be configured to wirelessly communicate with user devices. Wireless communication may be established between the first access control device 110a and a user device (e.g., the first user device 104a) if the user device is present within a detection range of the first access control device 110a. In other words, wireless communication may be established between the first access control device 110a and the user device if a distance between the user device and the first access control device 110a is below a threshold. For the sake of brevity, the term "detection range" is interchangeably referred to as a "threshold distance" throughout the disclosure. Therefore, wireless communication may be established between the first access control device 110a and the user device when the user device is within the threshold distance of the first access control device 110a. The threshold distance may vary depending on a type of wireless communication used by the first access control device 110a. Examples of the type of wireless communication that may be used or supported by the first access control device 110a include, but are not limited to, RF communication, near-field communication (NFC), Bluetooth low-energy (BLE), Wi-Fi, or the like.

The digital key that may be stored in the user device (e.g., the first user device 104a) of a user (e.g., the first user 102a) enables the user to access one or more functions or components (e.g., the plurality of vehicular systems) of the vehicle 106. For example, if the digital key to the vehicle 106 is stored in the first user device 104a, the set of doors of the vehicle 106 may be automatically unlocked when the first user 102a, carrying the first user device 104a, approaches the vehicle 106 or when the first user 102a places his hand on a door handle of one of the set of doors. Similarly, the boot-lid of the vehicle 106 may be automatically unlocked for the first user 102a carrying the first user device 104a when the first user 102a approaches a rear of the vehicle 106 or when the first user 102a places his hand on the boot lid of the vehicle 106. Similarly, the first user 102a may access other functions or components of the vehicle 106 (e.g., a fuel-port of the vehicle 106 or a charging-port of the vehicle 106) based on whether the digital key is stored in the first user device 104a. Further, the vehicle 106 may be switched on and/or driven by the first user 102a based on whether the digital key is stored in the first user device 104a that is carried by the first user 102a.

The first access control device 110a may include a processor 118, control circuitry 120, a power source 122, and a first network interface 124.

The processor 118 may include suitable logic, circuitry, interfaces, and/or code, executable by the circuitry, that may be configured to control or regulate access to the vehicle 106. In other words, the processor 118 may be configured to control a functioning of the plurality of vehicular systems in the vehicle 106. For example, the processor 118 may control a set of motors included in the door locking/unlocking system for locking/unlocking the set of doors of the vehicle 106. The processor 118 may further control circuits or components responsible for starting an engine in the vehicle 106, driving a starter motor in the vehicle 106, and/or one or more accessories (e.g., an air-conditioner, a music system, a multi-information display, a touchscreen console) in the vehicle 106. In one embodiment, the first access control device 110a (e.g., the processor 118) may store, therein, a set of primary digital keys. The primary digital keys may be provided by an original equipment manufacturer of the vehicle 106 and may not be shared with the first user device 104a and the application server 112. For example, the set of primary digital keys may include first and second primary digital keys for locking and unlocking the set of doors of the vehicle 106, respectively. Similarly, the set of primary digital keys may include third and fourth primary digital keys for locking and unlocking the boot lid of the vehicle 106. It will be apparent to those of skill in the art that the set of primary digital keys may include other primary digital keys associated with the plurality of vehicular systems. The processor 118 may use the set of primary digital keys for controlling access to the plurality of vehicular systems in the vehicle 106. Examples of the processor 118 may include, but are not limited to, an application-specific integrated circuit (ASIC) processor, a reduced instruction set computer (RISC) processor, a complex instruction set computer (CISC) processor, a field-programmable gate array (FPGA), and the like.

The control circuitry 120 may include suitable logic, circuitry, interfaces, and/or code, executable by the circuitry, that may be configured to generate passcodes (e.g., secondary digital keys associated with the vehicle 106) for accessing the vehicle 106. A generated passcode may be a random digital code such as a 128-bit code, a 256-bit code, or the like. For the sake of brevity, the term "secondary digital key" is interchangeably referred to as "passcode" throughout the disclosure. The passcode generated by the control circuitry 120 may be wirelessly transmitted or communicated, by way of the first network interface 124, to the first user device 104a when the first user device 104a is within the threshold distance of the first access control device 110a. Wireless communication between the first user device 104a and the first access control device 110a may take place by way of RF signals (e.g., radio waves). In a non-limiting example, NFC is used for wireless communication. However, in various other embodiments, other wireless communication techniques or methods such as Wi-Fi, BLE, or the like may be used.

Prior to the transmission of the passcode to the first user device 104a, the control circuitry 120 may acquire and ascertain an identity of the first user device 104a to ensure that the first user device 104a is an intended recipient of the passcode. For example, the control circuitry 120 (e.g., the first access control device 110a) may request the first user device 104a to provide an identifier of the first user device 104a. Based on the request, the first user device 104a may communicate the identifier of the first user device 104a to the first access control device 110a. The control circuitry 120 may compare the identifier received from the first user device 104a to a unique known identifier of the first user device 104a that may be stored in the control circuitry 120 or a storage circuit (not shown) in the first access control device 110a. If the received identifier and the known identifier match, the control circuitry 120 may communicate the passcode to the first user device 104a. It will be apparent to those of skill in the art the transmission of the passcode to the first user device 104a may take place when the first user device 104a is within the threshold distance of the first access control device 110a. Examples of the identifier of the first user device 104a may include, but are not limited to, a unique identifier of a first NFC tag included in the first user device 104a, a unique identifier of an RF tag included in the first user device 104a, an internal mobile equipment identity (IMEI) number of the first user device 104a, or the like.

The generated passcode may be suitably encrypted, by the control circuitry 120, before the generated passcode is transmitted to the first user device 104a. Further, the transmission of the passcode may be secured by using various techniques such as adding pseudorandom noise to RF signals used for the transmission. Methods of securely transferring data and encrypting and decrypting sensitive information or signals are well-known to those of skill in the art. It will be apparent to those of skill in the art that all communication between the first access control device 110a and the set of user devices 104 may be encrypted to mitigate security risks. The first user device 104a may store, therein, the passcode received from the first access control device 110a (e.g., the control circuitry 120). For example, the first user device 104a may write the received passcode to the first NFC tag included in the first user device 104a. In other words, the first NFC tag in the first user device 104a stores the passcode. The passcode may thus be synchronized between the first access control device 110a and the first user device 104a.

The control circuitry 120 may be further configured to control a power supply to the processor 118. The processor 118 draws power from the power source 122 (e.g., a battery) by way of the control circuitry 120. In other words, the processor 118 is coupled to the power source 122 by way of the control circuitry 120. It will be apparent to those of skill in the art that the power source 122 may include all sources of alternating current (AC) and direct current (DC) voltages, such as, but not limited to, mains electricity, batteries, or the like. In a non-limiting example, the power source 122 is a 2-3.3 Volt (V) battery.

The control circuitry 120 may enable the processor 118 to be switched on or off. In one embodiment, the processor 118 may be switched on or off (e.g., activated or deactivated), by controlling a position of a relay (not shown) included in the control circuitry 120. For example, when the relay is in an "OPEN" position, a connection between the processor 118 and the power source 122 is incomplete, thereby disconnecting (e.g., decoupling) the processor 118 from the power source 122 and rendering the processor 118 deactivated. Similarly, when the relay is in a "CLOSED" position, a connection between the processor 118 and the power source 122 is complete, thereby connecting (e.g., coupling) the processor 118 to the power source 122 and rendering the processor 118 active. In one embodiment, the vehicle 106 may be inaccessible when the processor 118 is switched off (e.g., in a power-down state). In other words, the set of doors of the vehicle 106, the boot lid of the vehicle 106, the fuel-port lid of the vehicle 106, or the like, may be shut or locked when the processor 118 is switched off. The relay included in the control circuitry 120 may be "normally OPEN". The control circuitry 120 may actuate the relay (e.g., move the relay to the "CLOSED" position) when a user device (e.g., the first user device 104a) that is within the threshold distance of the first access control device 110a communicates a correct passcode to the control circuitry 120. The control circuitry 120 may validate the received passcode by comparing the received passcode with the passcode stored in the control circuitry 120. If the passcode is successfully validated, the control circuitry 120 actuates the relay, and power is supplied from the power source 122 to the processor 118, switching on or powering on the processor 118.

The first network interface 124 may include suitable logic, circuitry, interfaces, and/or code, executable by the circuitry, that may be configured to facilitate communication with user devices (e.g., the set of user devices 104). The first network interface 124 may also facilitate internal communication between components (e.g., the processor 118, the control circuitry 120, or the like) included in the first access control device 110a. The first network interface 124 may further facilitate communication between the first access control device 110a and other vehicular components (e.g., the set of motors) present in the vehicle 106. Examples of the first network interface 124 may include, but are not limited to, an antenna, an RF transceiver, a wireless transceiver, a Bluetooth transceiver, an ethernet port, a universal serial bus (USB) port, or any other device configured to transmit and receive data.

In one embodiment, the passcode may be valid only for a limited period of time. For example, the passcode may be valid for a time-period of "7" hours. After "7" hours from a time of synchronization between the first access control device 110a (e.g., the control circuitry 120) and the first user device 104a, a new passcode may be generated by the control circuitry 120. However, the new passcode may be used for accessing the vehicle 106 only after the new passcode is synchronized with the first user device 104a. The new passcode may be synchronized with the first user device 104a, whenever the first user device 104a is within a threshold distance of the first access control device 110a.

In one embodiment, based on the identifier of the first user device 104a, the first access control device 110a may recognize the first user device 104a as a trusted or primary device associated with the vehicle 106. Therefore, whenever the first user device 104a is within the threshold distance of the first access control device 110a, the first access control device 110a may synchronize a latest generated passcode with the first user device 104a. For example, when the first access control device 110a receives a valid passcode (e.g., the secondary digital key) from the first user device 104a that is within the threshold distance, the first access control device 110a may communicate the second primary digital key to the set of motors for unlocking the set of doors of the vehicle 106 for the first user 102a. For the sake of brevity, the term "set of doors" is interchangeably referred to as "doors" throughout the disclosure.

The facility 108 may be a warehouse, a storeroom, a distribution center, a residential premise, an office, or the like associated with the first user 102a. The facility 108 may be associated with a digital key that enables access to the facility 108. Access to the facility 108 is controlled by the second access control device 110b. It will be apparent to those of skill in the art that the second access control device 110b may be functionally similar to the first access control device 110a. The second access control device 110b may control or regulate access to the facility 108 in a similar manner as described above.

The application server 112 may include suitable logic, circuitry, interfaces, and/or code, executable by the circuitry, that may be configured to facilitate sharing of the secondary digital keys between user devices (e.g., the first and second user devices 104a and 104b). The application server 112 hosts the service application 116 that is executed on the set of user devices 104. Further, the application server 112 offers a cloud-based key-sharing service that enables users to share keys to access various assets (e.g., the vehicle 106 and the facility 108). The cloud-based key-sharing service may be available to users that are registered with the application server 112 (e.g., the service application 116). For the sake of brevity, the term "cloud-based key-sharing service" is interchangeably referred to as "key-sharing service" throughout the disclosure. Examples of the application server 112 may include, but are not limited to, a personal computer, a laptop, a mini-computer, a mainframe computer, a cloud-based server, a network of computer systems, or a non-transient and tangible machine executing a machine-readable code.

In operation, a user (e.g., the set of users 102) intending to use the service application 116 for providing or receiving access (e.g., sharing keys) to an asset (e.g., the vehicle 106) may initiate a registration process for registering with the service application 116. For example, upon an installation of the service application 116 on the first user device 104a, the service application 116 may prompt the first user 102a to register or sign-up for the key-sharing service. In other words, the first user 102a may be prompted to create a first set of login credentials (e.g., a username and a password) for accessing/using the service application 116. Following the entering of the login credentials by the first user 102a, the service application 116 may request or prompt the first user 102a to enter information (e.g., vehicle information) of one or more assets (e.g., the vehicle 106 and the facility 108) to be enrolled for the key-sharing service. For the sake of brevity, the current embodiment is described in regard to the vehicle 106. It will be apparent to those of skill in the art that key-sharing for the facility 108 may proceed in a similar fashion.

Vehicle information of the vehicle 106 may be entered by the first user 102a in the service application 116. Examples of the vehicle information may include, but are not limited to, a vehicle identification number (VIN) of the vehicle 106, a registration number of the vehicle 106, a chassis number of the vehicle 106, a make and model of the vehicle 106, a color of the vehicle 106, a name of an owner of the vehicle 106, or the like. In some embodiments, the service application 116 may further prompt the first user 102a to enter his/her contact details (e.g., a phone number or an email address) and a third-party access code (e.g., a personal identification number) for authenticating or validating key-sharing requests initiated by the first user 102a. The application server 112 may store, therein, the contact details and the login credentials of the first user 102a, the third-party access code, and the vehicle information of the vehicle 106.

The second user 102b may also register with the service application 116 in a similar manner. However, for the sake of brevity, it is assumed that the second user 102b does not wish to enroll any of his assets for the key-sharing service, and, therefore, enters only his login credentials and contact details. The login credentials and the contact details of the second user 102b may be stored by the application server 112. Thus, the first and second users 102a and 102b are registered with the application server 112 for availing the key-sharing service.

The first access control device 110a (e.g., the control circuitry 120) may generate a first passcode that is to be used for accessing the vehicle 106. Upon the generation of the first passcode, the first access control device 110a may communicate the first passcode to the first user device 104a. The first passcode is thus synchronized between the first access control device 110a and the first user device 104a. In a non-limiting example, the first NFC tag included in the first user device 104a stores the first passcode received from the first access control device 110a. In one embodiment, the service application 116 being executed on the first user device 104a may be provided requisite permissions or rights by the first user 102a to retrieve a latest passcode stored in the first NFC tag. In such a scenario, the service application 116 may always store, therein, the latest passcode synchronized between the first user device 104a and the first access control device 110a. However, in another embodiment, the service application 116 may not have the requisite permissions to read data stored in the first NFC tag. In such a scenario, the service application 116 may retrieve the passcode from the first NFC tag (e.g., read the first NFC tag) only when a temporary permission is granted by the first user 102a and/or when a key-sharing request is raised by the first user 102a. For the sake of brevity, it is assumed that the service application 116 is granted the requisite permissions or rights to always retrieve the latest passcode stored in the first NFC tag. The first passcode is thus further synchronized between the first user device 104a and the application server 112 by way of the service application 116.

The first user 102a may intend to grant access rights to the second user 102b for accessing the vehicle 106. Granting access rights to the second user 102b for accessing an asset (e.g., the vehicle 106) may be defined as sharing, with the second user 102b, a secondary digital key to the asset. In other words, the first user 102a may intend to share, with the second user 102b, the secondary digital key (e.g., the first passcode) to the vehicle 106. In a non-limiting example, the second user 102b may be an acquaintance of the first user 102a, and may wish to retrieve an item that was left behind in the vehicle 106. In such a scenario, the first user 102a may use the service application 116 to enable the second user 102b to access the vehicle 106. It is assumed, for the sake of brevity, that the first passcode stored in the first NFC tag is a latest passcode synchronized between the first user device 104a and the first access control device 110a.

For granting access rights to the second user 102b, a key-sharing request may be initiated by the first user 102a by way of the service application 116. The key-sharing request is a request for granting access rights to the second user 102b for accessing the vehicle 106. In other words, the key-sharing request is a request for sharing the secondary digital key of the vehicle 106 with the second user 102b. The key-sharing request may include an identifier (e.g., the contact details) of the second user 102b for uniquely identifying the second user 102b as an intended recipient of the secondary digital key of the vehicle 106. In some cases, the key-sharing request may further include an access duration (e.g., "25" minutes) defined by the first user 102a. The access duration may indicate a total time-period for which the vehicle 106 is to remain accessible to the second user 102b from a time-instant at which the vehicle 106 is accessed by the second user 102b. The key-sharing request may also include the third-party access code that may be entered by the first user 102a when the first user 102a initiates the key-sharing request. In scenarios where the first user 102a has enrolled multiple assets to the key-sharing service, the key-sharing request may further include a selection, by the first user 102a, of an asset (e.g., the vehicle 106) for which access rights are to be shared.

Upon receiving the key-sharing request from the first user device 104a, the application server 112 may authenticate or validate the key-sharing request based on the third-party access code included in the key-sharing request. Consequently, the application server 112 may identify the second user 102b as the intended recipient of access rights to the vehicle 106, based on the identifier (e.g., the contact details) of the second user 102b that is included in the key-sharing request. The application server 112 may further identify the second user device 104b that is associated with the second user 102b. Further, based on the key-sharing request, the application server 112 may communicate a set of access credentials to the second user device 104b. The set of access credentials may include the first passcode and the access duration. The application server 112 may further communicate, to the second user device 104b, details (e.g., the vehicle information) of the vehicle 106. The service application 116, being executed on the second user device 104b, may write the first passcode to a second NFC tag included in the second user device 104b. The service application 116 may display, on a display screen of the second user device 104b, the access duration and the details of the vehicle 106.

The vehicle 106 may be consequently approached by the second user 102b carrying the second user device 104b. When the second user device 104b is within the threshold distance of the first access control device 110a (e.g., when a connection is established between the control circuitry 120 and the second user device 104b), the control circuitry 120 may receive an access request for accessing the vehicle 106 from the second user device 104b. The access request may be an RF signal that includes the first passcode and an identifier of the second user device 104b. The access request may further include the access duration. Examples of the identifier of the second user device 104b may include, but are not limited to, an identifier of the second NFC tag, an identifier of a second RF chip included in the second user device 104b, an IMEI number of the second user device 104b, or the like.

The control circuitry 120 may determine that a user different from the first user 102a is attempting to access the vehicle 106, based on a mismatch between the identifier of the second user device 104b and the identifier of the first user device 104a that is stored in the control circuitry 120. Based on the determination that a user different from the first user 102a is attempting to access the vehicle 106, any new passcode generated by the first access control device 110a may not be transmitted to or synchronized with the second user device 104b. The control circuitry 120 may then compare a passcode (e.g., the first passcode) included in the access request with the first passcode stored in the control circuitry 120. The control circuitry 120 may determine that the passcode included in the access request matches the first passcode stored in the control circuitry 120. Consequently, the control circuitry 120 actuates the relay, moving the relay to the "CLOSED" position, thereby, enabling the supply of power from the power source 122 to the processor 118. Thus, the processor 118 is switched or powered on.

Based on the successful validation of the first passcode included in the access request, the processor 118 may provide the second user 102b access to the vehicle 106. For example, the processor 118 may actuate the set of motors that control the locking/unlocking of the doors, thereby unlocking the doors of the vehicle 106. The processor 118 may actuate the set of motors using the second primary digital key. When the doors of the vehicle 106 are unlocked, the first access control device 110a (e.g., the control circuitry 120) may communicate, to the second user device 104b, a message (e.g., notification) indicating that the doors of the vehicle 106 are now unlocked (e.g., access is approved for the second user 102b). The service application 116 being executed on the second user device 104b may display the message on the display screen of the second user device 104b. Further, the service application 116 may communicate the message to the application server 112. The message may further indicate a time-stamp of a time-instance (e.g., 5:35 pm, $22^{nd}$ May) at which the doors were unlocked for the second user 102b. Further, the application server 112 may communicate the message to the first user device 104a. The service application 116 on the first user device 104a may display the notification on a display screen of the first user device 104a.

The unlocked doors of the vehicle 106 may be opened by the second user 102b and the item may be retrieved from the vehicle 106 by the second user 102b within the access duration. The doors of the vehicle 106 may then be shut by the second user 102b, and the second user 102b may walk away from the vehicle 106. When the second user 102b leaves the threshold distance of the first access control device 110a, the first access control device 110a does not detect the RF signal that was being transmitted by the second user device 104b. Therefore, the control circuitry 120 moves back to the "OPEN" position from the "CLOSED" position, powering down the processor 118. Before powering down, the processor 118 may communicate one or more commands (e.g., the first primary digital key) to the set of motors for locking the doors of the vehicle 106.

When the second user device 104b is no longer connected to the first access control device 110a, the service application 116 on the second user device 104b may communicate a notification to the application server 112, indicating that the second user 102b has exited the vehicle 106. The application server 112 may communicate, to the first user device 104a, the notification indicating that the second user 102b has exited the vehicle 106. The service application 116 on the first user device 104a may display the notification on the display screen of the first user device 104a. Further, based on the notification, the application server 112 may revoke the access rights of the second user 102b to the vehicle 106. The application server 112 may communicate an access credentials deletion request to the second user device 104b. Based on the access credentials deletion request, the service application 116 may delete the first passcode from the second NFC tag in the second user device 104b. Based on the deletion of the first passcode, the service application 116 on the second user device 104b may communicate an access credentials deletion response to the application server 112, indicating that the first passcode is deleted from the second user device 104b. Consequently, the application server 112 may communicate, to the first user device 104a, a message indicating that the access rights of the second user 102b to the vehicle 106 have been revoked. In another embodiment, the application server 112 may revoke the access rights of the second user 102b only upon expiry of the access duration. The process of key-sharing and access control is explained in conjunction with FIGS. 3A-3E.

In another embodiment, passcodes (e.g., the secondary digital keys) for the vehicle 106 may be generated by the service application 116 running on the first user device 104a. In such scenarios, upon generation of a passcode, the first user device 104a may communicate the passcode to the first access control device 110a, when the first user device 104a is within the threshold distance of the first access control device 110a. The first access control device 110a may store, therein, the passcode received from the first user device 104a, thereby synchronizing the passcode between the first access control device 110a and the first user device 104a. The first user device 104a may further synchronize the generated passcode with the application server 112.

In another embodiment, passcodes for the vehicle 106 may be generated by the application server 112. In such a scenario, a passcode generated by the application server 112 may be communicated to the first user device 104a, which, in turn, synchronizes the passcode with the first access control device 110a.

In another embodiment, the system environment 100 may further include another portable device (e.g., an access card; not shown) associated with the first user 102a. The first access control device 110a may be configured to recognize the portable device, in addition to the first user device 104a, as a trusted device associated with the vehicle 106 and/or the first user 102a. The first access control device 110a may communicate, to the portable device, any passcode (e.g., the first passcode) generated by the first access control device 110a. In other words, any passcode generated by the first access control device 110a may be synchronized with the portable device, provided the portable device is within the threshold distance of the first access control device 110a. The portable device may be used by the first user 102a to access the vehicle 106, in lieu of the first user device 104a. Further, the portable device may be capable of synchronizing passcodes with the first user device 104a.

Figure 2:
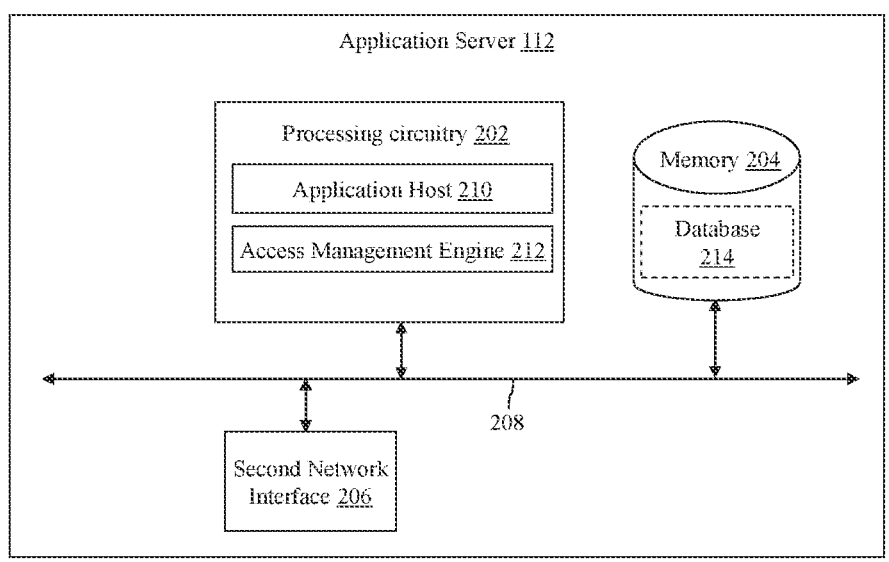
FIG. 2 is a block diagram that illustrates an application server of FIG. 1, in accordance with an exemplary embodiment of the present disclosure.

FIG. 2 is a block diagram that illustrates the application server 112, in accordance with an exemplary embodiment of the present disclosure. The application server 112 may include processing circuitry 202, a memory 204, and a second network interface 206. The processing circuitry 202, the memory 204, and the second network interface 206 may communicate with each other by way of a communication bus 208.

The processing circuitry 202 may include suitable logic, circuitry, interfaces, and/or code, executed by the circuitry, to facilitate cloud-based key-sharing. The processing circuitry 202 may be configured to receive key-sharing requests from the user and grant access rights to users, based on the received key-sharing requests. Examples of the processing circuitry 202 may include, but are not limited to, an ASIC processor, a RISC processor, a CISC processor, an FPGA, and the like. The processing circuitry 202 may include an application host 210 and an access management engine 212, and may execute various operations for facilitating cloud-based key-sharing by way of the application host 210 and the access management engine 212.

The application host 210 may host the service application 116 that enables the set of users 102 to avail the key-sharing service. The application host 210 may receive, from user devices (e.g., the first user device 104*a*), key-sharing requests for sharing secondary digital keys to access various assets. The application host 210 may further receive from the user devices, the secondary digital keys (e.g., the first passcode) that are stored in the user devices.

The access management engine 212 may manage sharing of access rights with users, based on the key-sharing requests received by the application host 210. Based on the key-sharing requests, the access management engine 212 may grant users (e.g., the second user 102*b*), temporary access rights to access various assets (e.g., the vehicle 106). The access management engine 212 may communicate, to user devices of these users, access credentials (e.g., the set of access credentials) required for accessing the various assets. Further, the access management engine 212, when required, may initiate deletion of the access credentials stored in the user devices.

The memory 204 may include suitable logic, circuitry, interfaces, and/or code, executable by the circuitry, to store information required for facilitating cloud-based key-sharing. The memory 204 may include a database 214 that stores, therein, login credentials (e.g., username and password) and contact details (e.g., email address, phone number, or the like) of users (e.g., the first user 102*a*) registered with the application server 112 for the key-sharing service. The database 214 may further store, therein, details of assets (e.g., the vehicle information of the vehicle 106) enrolled by the registered users for the key-sharing service. Further, the database 214 may store, therein, passcodes (e.g., the first passcode) retrieved from user devices (e.g., the first user device 104*a*). The database 214 may further store validity periods and time-stamps associated with the passcodes. Additionally, the database 214 may store key-sharing data which may include, but is not limited to, details of recipients (e.g., the second user 102*b*) who received access rights to an asset, access logs of these recipients (e.g., a time of entry and/or time of exit of the second user 102*b* from the vehicle 106), or the like. Examples of the memory 204 may include a random-access memory (RAM), a read-only memory (ROM), a removable storage drive, a hard disk drive (HDD), a flash memory, a solid-state memory, or the like. It will be apparent to a person skilled in the art that the scope of the disclosure is not limited to realizing the memory 204 in the application server 112, as described herein. In another embodiment, the memory 204 may be realized in form of a database server or a cloud storage working in conjunction with the application server 112, without departing from the scope of the disclosure.

The second network interface 206 may include suitable logic, circuitry, interfaces, and/or code, executable by the circuitry, to transmit and receive data over the communication network 114 using one or more communication network protocols. The second network interface 206 may transmit requests and messages to and receive requests and messages from the set of user devices 104. Examples of the second network interface 206 may include, but are not limited to, an antenna, a radio frequency transceiver, a wireless transceiver, a Bluetooth transceiver, an ethernet port, a universal serial bus (USB) port, or any other device configured to transmit and receive data.

FIGS. 3A-3E, are diagrams, which collectively, represents a process flow diagram 300 that illustrates a process for facilitating the cloud-based sharing of the digital keys, in accordance with an exemplary embodiment of the disclosure. The process flow diagram 300 is explained in conjunction with FIG. 1. The process flow diagram 300 includes the first access control device 110*a*, the set of user devices 104, and the application server 112. For the sake of brevity, it is assumed that the first and second users 102*a* and 102*b* are already registered with the application server 112 for the key-sharing service. It is further assumed that the vehicle 106 is already enrolled for the key-sharing service.

Figure 3A:
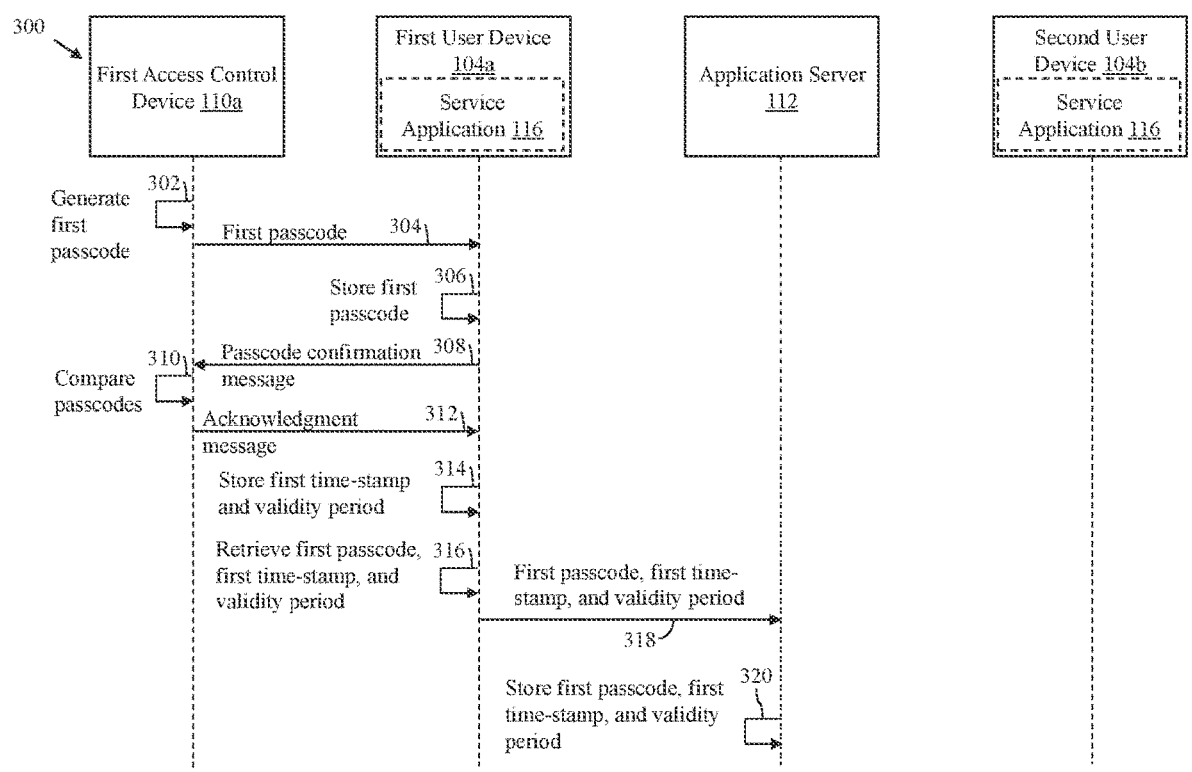
FIGS. 3A-3E, are diagrams, which collectively, represents a process flow diagram that illustrates a process for facilitating the cloud-based sharing of the digital keys, in accordance with an exemplary embodiment of the disclosure.

Referring now to FIG. 3A, the first access control device 110*a* (e.g., the control circuitry 120) generates the first passcode (as shown by arrow 302). The first user device 104*a* may be within the threshold distance of the first access control device 110*a*. Consequently, the first access control device 110*a* (e.g., the control circuitry 120) may communicate (e.g., transmit) the generated first passcode to the first user device 104*a* (as shown by arrow 304), as described in the foregoing description of FIG. 1. The first user device 104*a* may store, therein, the first passcode (as shown by arrow 306). In order to ensure passcode synchronization between the first access control device 110*a* and the first user device 104*a*, the first user device 104*a* may transmit or communicate a passcode confirmation message to the first access control device 110*a* (as shown by arrow 308). The passcode confirmation message may include the first passcode received by the first user device 104*a* and may be received by the control circuitry 120 by way of the first network interface 124, as described in the foregoing description of FIG. 1. Upon receiving the passcode confirmation message, the control circuitry 120 may determine whether the first passcode generated/stored by the control circuitry 120 is the same as the first passcode included within the passcode confirmation message (as shown by arrow 310). If the first passcode, included in the passcode confirmation message, matches the first passcode that was generated by the control circuitry 120, the control circuitry 120 may communicate an acknowledgment message to the first user device 104*a* (as shown by arrow 312).

The acknowledgment message may indicate that the synchronization of the first passcode is successful. Further, the acknowledgment message may include a first time-stamp that is indicative of a time-instance at which the first passcode was synchronized between the first user device 104*a* and the first access control device 110*a*. The acknowledgment message may further include a validity period (e.g., "7" hours) indicating a time-period for which the first passcode is valid. The first passcode may expire when the validity period elapses. The first user device 104*a* may store, therein, the first time-stamp and the validity period (as shown by arrow 314).

If a passcode (e.g., the first passcode) included in the passcode confirmation message does not match the first passcode stored by the control circuitry 120, the first access control device 110*a* may communicate an error message to the first user device 104*a*, indicating that the synchronization of the first passcode between the first access control device 110*a* and the first user device 104*a* has failed. Consequently, the first access control device 110*a* may generate a new passcode and/or re-attempt synchronization with the first user device 104*a*. However, for the sake of brevity, it is assumed that the first passcode is successfully synchronized between the first user device 104*a* and the first access control device 110*a*.

The service application 116 that is being executed on the first user device 104*a* may retrieve the first passcode, the first time-stamp, and the validity period from the first user device 104*a*, if the service application 116 has been granted the requisite permissions or rights by the first user 102*a* (as shown by arrow 316). The service application 116 may communicate the retrieved first passcode, the first time-stamp, and the validity period to the application server 112 (as shown by arrow 318). The application server 112 stores, therein, the first passcode, the first time-stamp, and the validity period of the first passcode (as shown by arrow 320). The application server 112 may store, in the database 214, passcodes, time-stamps, and validity periods for each asset enrolled for the key-sharing service.

In another embodiment, the service application 116 may not have the requisite permissions to retrieve passcodes, validity periods, and/or time-stamps from the first user device 104*a*. In such a scenario, the service application 116 may prompt the first user 102*a* to provide explicit permission for retrieving the passcodes, validity periods, and/or time-stamps when the first user 102*a* initiates a key-sharing request by way of the service application 116.

Figure 3B:
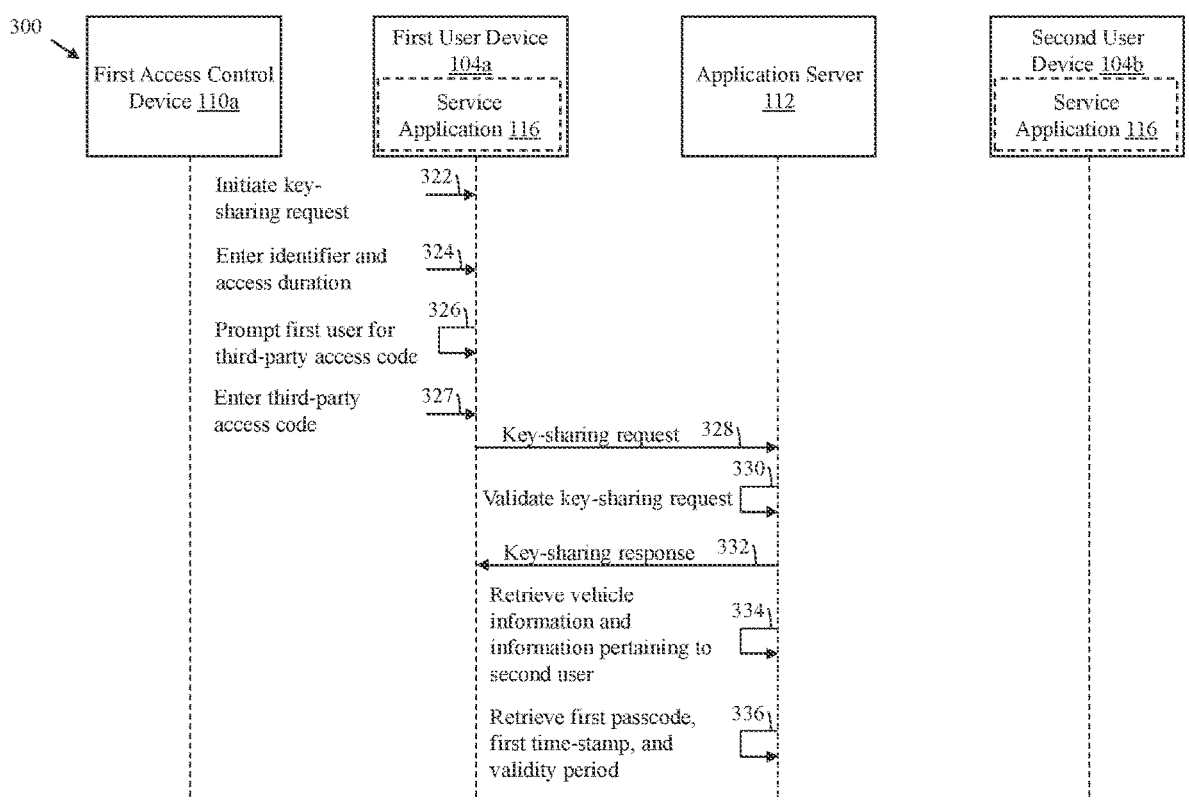

Referring now to FIG. 3B, the first user 102*a* may intend to grant the second user 102*b* temporary access rights to the vehicle 106. In such a scenario, the first user 102*a* may be at a remote location with respect to the vehicle 106. In other words, a distance between the first user device 104*a* (e.g., the first user 102*a*) and the first access control device 110*a* (e.g., the vehicle 106) may be greater than the threshold distance (e.g., the detection range of the first access control device 110*a*). As described in the foregoing description of FIG. 1, to grant the access rights, the key-sharing request may be initiated by the first user 102*a* by way of the service application 116 running on the first user device 104*a* (as shown by arrow 322). For initiating the key-sharing request, the identifier (e.g., a registered phone number, a registered email address, a registered username, or the like) of the second user 102*b* and an access duration for accessing the vehicle 106 may be entered by the first user 102*a* in the service application 116 (as shown by arrow 324). In cases where the first user 102*a* has enrolled assets for the key-sharing service, the first user 102*a* may also be required to select an asset for which access rights are granted. In a non-limiting example, only the vehicle 106 has been enrolled by the first user 102*a* for the key-sharing service.

Upon initiation of the key-sharing request by the first user 102*a*, the service application 116 may prompt the first user 102*a* to enter the third-party access code (as shown by arrow 326). The third-party access code may be entered by the first user 102*a* in the service application 116 (as shown by arrow 327). The service application 116 may then generate and communicate the key-sharing request to the application server 112 (as shown by arrow 328). The key-sharing request may include the identifier of the second user 102*b*, the access duration, and the third-party access code.

Upon receiving the key-sharing request, the application server 112 may validate (e.g., authenticate) the key-sharing request based on the third-party access code included in the key-sharing request (as shown by arrow 330). In other words, the application server 112 may compare the third-party access code included in the key-sharing request with the third-party access code stored in the application server 112 (e.g., in the database 214). If the third-party access code included in the key-sharing request and the third-party access code stored in the application server 112 do not match, the application server 112 may communicate a message to the first user device 104*a*, indicating the third-party access code entered by the first user 102*a* is invalid. The service application 116, being executed on the first user device 104*a*, may prompt the first user 102*a* to re-enter the third-party access code. In a non-limiting example, the third-party access code included in the key-sharing request and the third-party access code stored in the application server 112 match. Consequently, the application server 112 may communicate a key-sharing response to the first user device 104*a*, indicating that the key-sharing request is approved (as shown by arrow 332).

Based on the key-sharing request, the application server 112 may retrieve the vehicle information of the vehicle 106 and information (e.g., contact details) pertaining to the second user 102*b* (as shown by arrow 334). The application server 112 may further retrieve, from the database 214, the first passcode, the validity period, and the first time-stamp (as shown by arrow 336). In other words, the application server 112 may determine, based on information included in the key-sharing request, the vehicle 106 that is to be accessed by the second user 102*b*, the key associated with the vehicle 106, the second user 102*b* with whom the key is to be shared, and the second user device 104*b* on which the key is to be shared.

In a case where the service application 116 does not have the requisite permissions to retrieve passcodes, time-stamps, and/or validity periods stored in the first user device 104*a*, the service application 116 may prompt the first user 102*a* to enter the third-party access code when the first user 102*a* attempts to initiate the key-sharing request. The third-party access code may be validated by the application server 112, before the service application 116 is allowed to retrieve the first passcode, the first time-stamp, and the validity period from the first NFC tag. The key-sharing request may be initiated, generated, and communicated only after the entered third-party access code is validated by the application server 112. In such a scenario, the key-sharing request may further include the first passcode, the first time-stamp, and the validity period.

Figure 3C:
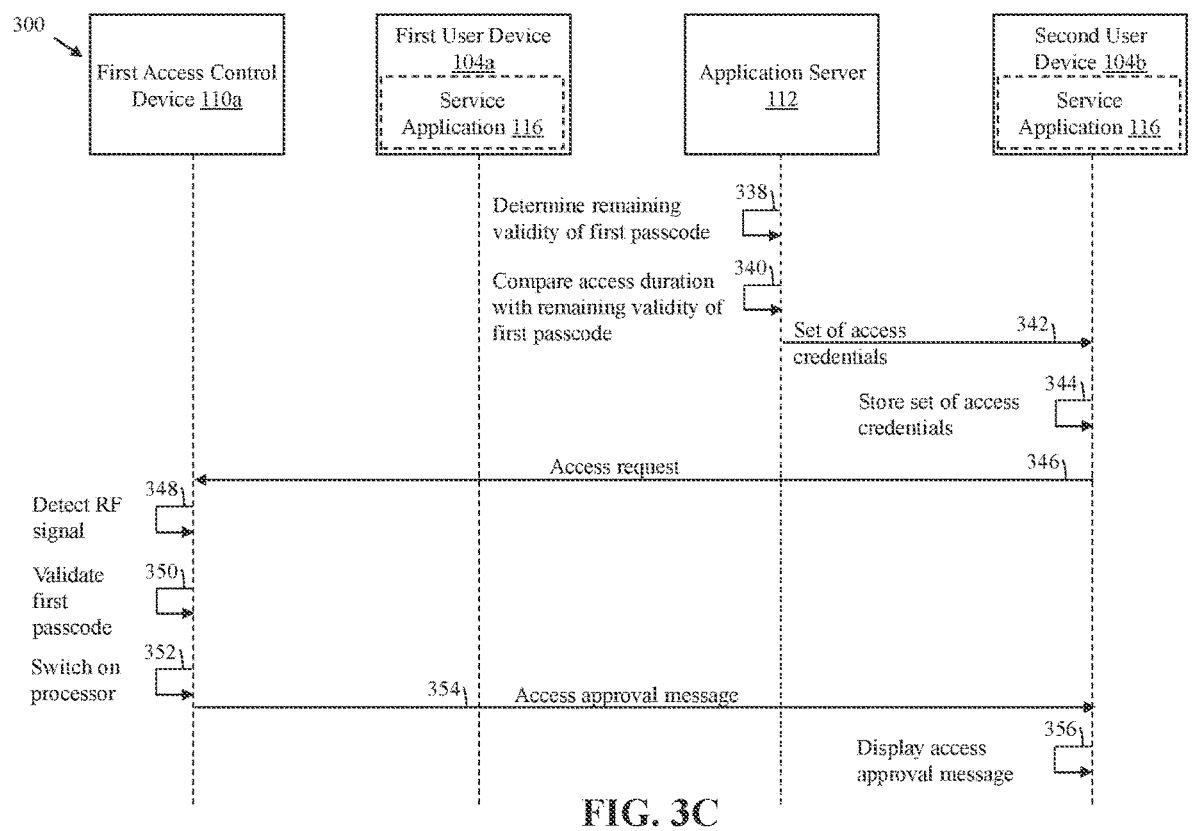

Referring now to FIG. 3C, the application server 112 may determine, based on the validity period and the first time-stamp, a remaining validity of the first passcode (as shown by arrow 338). For example, if the validity period is "7" hours and the first time-stamp indicates that the first passcode was synchronized at 4:00 pm on 22 May 2021, the first passcode may be valid until 11:00 pm on 22 May 2021. If the key-sharing request is received at 5:00 pm, the application server 112 may determine that "6" hours are remaining for the first passcode to expire. Further, the application server 112 may compare the access duration (e.g., "25" minutes) with the remaining validity (e.g., "6" hours) of the first passcode (as shown by arrow 340). If the remaining validity of the first passcode is less than the access duration or if a difference between the remaining validity of the first passcode and the access duration is less than a pre-determined threshold (e.g., "15" minutes), the application server 112 may deny the key-sharing request and communicate a passcode expiry notification to the first user device 104a. The passcode expiry notification may indicate that the key-sharing request is denied and that the first passcode is on the verge of expiry. Based on the passcode expiry notification, the service application 116 may display a message on the display screen of the first user device 104a, requesting the first user 102a to re-initiate the key-sharing request after a new passcode (e.g., a second passcode) is synchronized between the first user device 104a and the first access control device 110a.

However, in the current embodiment, the remaining validity of the first passcode (e.g., "6" hours) is greater than the access duration (e.g., "25" minutes). Therefore, the application server 112 may communicate, to the second user device 104b, a set of access credentials for enabling the second user 102b to access the vehicle 106 (as shown by arrow 342). In a non-limiting example, the set of access credentials may include the first passcode and the access duration. The application server 112 may further communicate, to the second user device 104b, the details (e.g., the make and model, the color, and/or the registration number) of the vehicle 106 to enable the second user 102b identify the vehicle 106.

The service application 116 on the second user device 104b may store, therein, the set of access credentials (as shown by arrow 344). In other words, the service application 116 may write the first passcode to the second NFC tag. Further, the service application 116 may display, on the display screen of the second user device 104b, a message indicating that a secondary digital key (e.g., the first passcode) to the vehicle 106 is shared with the second user 102b. The service application 116 may further display the access duration on the display screen of the second user device 104b.

The vehicle 106 may be approached by the second user 102b carrying the second user device 104b. When the second user device 104b is within the threshold distance of the first access control device 110a, the second user device 104b may communicate or transmit an access request to the first access control device 110a (as shown by arrow 346). In other words, the first access control device 110a (e.g., the control circuitry 120) may receive the access request from the second user device 104b to establish a connection therewith. The access request may be an RF signal that includes the first passcode and the identifier of the second user device 104b. In some cases, the RF signal may further include the access duration.

The control circuitry 120 may detect the RF signal being transmitted by the second user device 104b (as shown by arrow 348). The first access control device 110a (e.g., the control circuitry 120) may validate the first passcode included in the access request (as shown by arrow 350). In other words, the first access control device 110a may compare the first passcode included in the detected RF signal with the first passcode stored in the control circuitry 120. If the first access control device 110a (e.g., the control circuitry 120) determines that the first passcode included in the access request matches the first passcode stored in the control circuitry 120, the control circuitry 120 actuates the relay, moving the relay to the "CLOSED" position, thereby switching on the processor 118 (as shown by arrow 352).

Following the switching on of the processor 118, the control circuitry 120 may communicate an access approval message to the second user device 104b (as shown by arrow 354). The access approval message may indicate that the second user device 104b has established a connection with the first access control device 110a and that the second user 102b now has access to the vehicle 106. Thus, when the second user 102b is granted the access to the vehicle 106, the first user device 104a is beyond the detection range of the first access control device 110a. Further, the access approval message may include a second time-stamp indicative of a time-instance (e.g., 5:35 pm, $22^{nd}$ May) at which access to the vehicle 106 was granted to the second user 102b. The service application 116 may display the access approval message on the display screen of the second user device 104b (as shown by arrow 356).

Figure 3D:
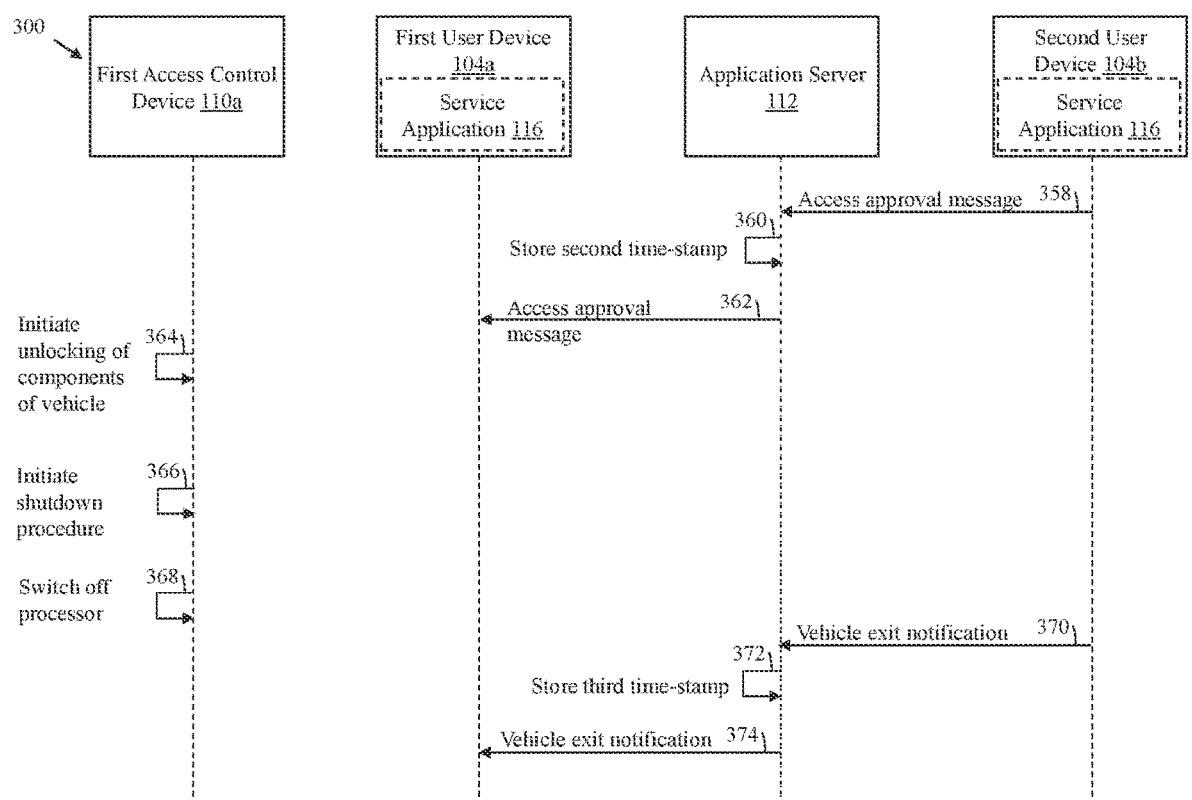

Referring now to FIG. 3D, the service application 116 being executed by the second user device 104b may communicate the access approval message to the application server 112 (as shown by arrow 358). The application server 112 may store, in the database 214, the second time-stamp (as shown by arrow 360). The application server 112 may also communicate the access approval message to the first user device 104a, notifying the first user 102a that the second user 102b has gained access to the vehicle 106 (as shown by arrow 362).

The processor 118, upon being switched on, may initiate the unlocking of one or more components, such as the doors of the vehicle 106 (as shown by arrow 364). As described in the foregoing description of FIG. 2, the processor 118 may initiate the unlocking of the one or more components, using the set of primary digital keys (e.g., the second primary digital key). The second user 102b may open the now-unlocked doors of the vehicle 106 and enter a cabin of the vehicle 106.

In one embodiment, the control circuitry 120 may constantly poll the second user device 104b for the first passcode. In other words, the control circuitry 120 may at regular intervals of time (e.g., every minute) request the second user device 104b to present a passcode. If the control circuitry 120 determines that the RF signal, being transmitted by the second user device 104b, no longer includes the first passcode, the control circuitry 120 may communicate a shutdown message to the processor 118, indicating that the second user 102b should no longer be provided access to the vehicle 106. In other words, if the second user device 104b fails to respond, to the request from the control circuitry 120, with the first passcode, the control circuitry 120 may communicate the shutdown message to the processor 118, indicating that the access of the second user 102b to the vehicle 106 is to be revoked. Based on the received message, the processor 118 may initiate a shutdown procedure.

Based on the initiation of the shutdown procedure, the processor 118 may control the set of motors to close/lock the doors of the vehicle 106, close/lock the boot lid of the vehicle 106, close/lock the charging port lid of the vehicle 106, or the like. Further, the processor 118 may initiate a shutting down of one or more accessories (e.g., the touchscreen console, the multi-information display, the music system, or the like) in the vehicle 106, as part of the shutdown procedure. In other words, based on the initiation of the shutdown procedure, the processor 118 may initiate a locking of various components in the vehicle 106. In one embodiment, prior to the initiation of the shut-down procedure, the processor 118 (e.g., the first access control device 110a) may provide visual or audio cues to the second user 102b to exit the vehicle 106. For example, the processor 118 may be configured to display a "Please exit the vehicle" or "Access is revoked" message on a display of the touchscreen console of the vehicle 106. Similarly, the processor 118 may be configured to play a "Please exit the vehicle" or "Access is revoked" message through one or more speakers in the vehicle 106.

However, for the sake of brevity, it is assumed that the RF signal transmitted by the first signal continues to include the first passcode while the second user 102b is in the cabin of the vehicle 106. The item may be retrieved from the vehicle 106 by the second user 102b. Further, the doors of the vehicle 106 may be shut by the second user 102b upon exiting the cabin of the vehicle 106. The second user 102b may then walk away.

When the second user device 104b is beyond the threshold distance of the first access control device 110a, the control circuitry 120 may fail to detect any signal (e.g., RF signal) from the second user device 104b, and may request the processor 118 to initiate the shutdown procedure. The processor 118 may initiate the shutdown procedure to lock the vehicle 106 (as shown by arrow 366). Following the completion of the shutdown procedure, the control circuitry 120 may actuate the relay, moving the relay back to the "OPEN" position and switching off (e.g., deactivating) the processor 118 (as shown by arrow 368). Alternatively, the control circuitry 120 may communicate the shutdown message to the processor 118 based on the lapse of the access duration. The operation of the processor 118 in such a scenario remains the same as described above.

When the service application 116 determines that the second user device 104b is no longer connected to the control circuitry 120, the service application 116 may communicate a vehicle exit notification to the application server 112, indicating that the second user 102b has exited the vehicle 106 (as shown by arrow 370). The vehicle exit notification may include a third time-stamp that is indicative of a time-instance (e.g., 5:40 pm, $22^{nd}$ May) at which the second user 102b exited the vehicle 106. The application server 112 may store, in the database 214, the third time-stamp (as shown by arrow 372). The application server 112 may communicate the vehicle exit notification to the first user device 104a, notifying the first user 102a of the exit of the second user 102b from the vehicle 106 (as shown by arrow 374).

Figure 3E:
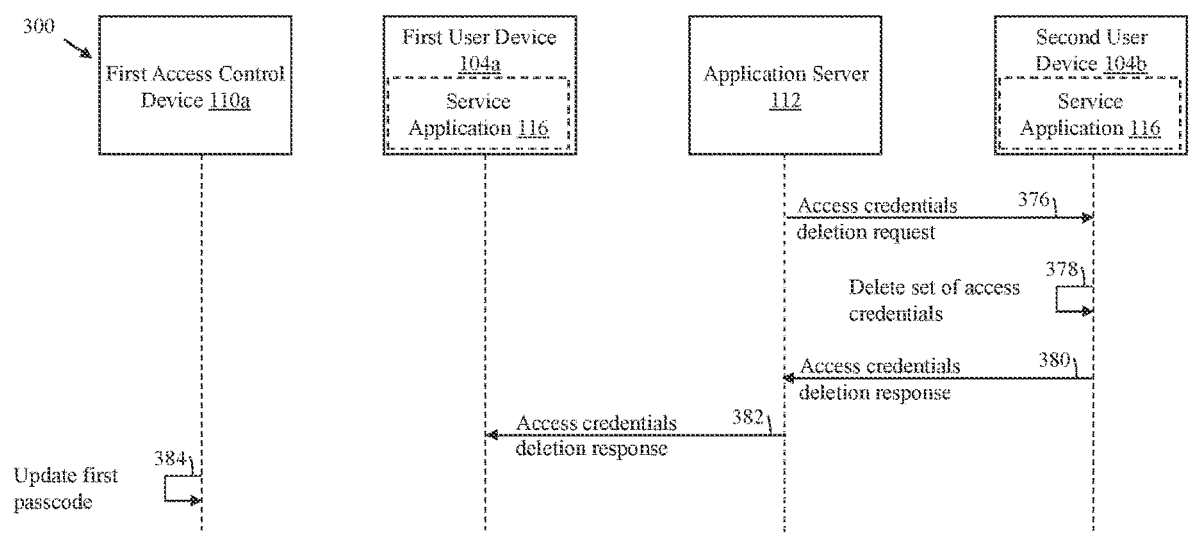

Referring now to FIG. 3E, based on the received vehicle exit notification, the application server 112 may communicate the access credentials deletion request to the service application 116 being executed on the second user device 104b (as shown by arrow 376). The access credentials deletion request may be a request for deletion of the set of access credentials communicated by the application server 112 to the second user device 104b. Based on the access credentials deletion request, the service application 116 may delete the set of access credentials from the second user device 104b, revoking access rights of the second user 102b to the vehicle 106 (as shown by arrow 378). The service application 116 may delete the first passcode stored in the second NFC tag. The service application 116 may further delete the access duration and the details of the vehicle 106 from the second user device 104b.

Following the deletion of the set of access credentials, the service application 116 may communicate an access credentials deletion response to the application server 112 (as shown by arrow 380). The access credentials deletion response may indicate that the set of access credentials has been deleted from the second user device 104b. The application server 112 may communicate the access credentials deletion response to the first user device 104a, notifying the first user 102a of the revocation of the access rights of the second user 102b to the vehicle 106 (as shown by arrow 382). The first access control device 110a may update the first passcode when the validity period elapses (as shown by arrow 384). In other words, the first access control device 110a may generate a second passcode when the first passcode expires. The second passcode may be synchronized with the first user device 104a when the first user device 104a is within the threshold distance of the first access control device 110a.

In FIGS. 3A-3E, it is assumed that passcodes are generated by the first access control device 110a. However, in another embodiment, passcodes for the vehicle 106 may be generated by the first user device 104a. In such scenarios, upon generation of a passcode, the first user device 104a may communicate the passcode to the first access control device 110a when the first user device 104a is within the threshold distance of the first access control device 110a. In other words, the first access control device 110a may receive the passcode from the first user device 104a when the first user device 104a is within the threshold distance of the first access control device 110a. The first access control device 110a may store, therein, the passcode received from the first user device 104a. The passcode may thus be synchronized between the first access control device 110a and the first user device 104a. The service application 116 that is being executed on the first user device 104a may further communicate the generated passcode to the application server 112 in a similar manner as described above.

In yet another embodiment, passcodes for the vehicle 106 may be generated by the application server 112. In such a scenario, the application server 112 may communicate the generated passcode to the first user device 104a, which, in turn, synchronizes the passcode with the first access control device 110a. In other words, the first access control device 110a may receive the passcode from the first user device 104a when the first user device 104a is within the threshold distance of the first access control device 110a to synchronize the passcode therewith. The remaining process for key-sharing, granting of access rights, and revocation of access rights may be the same as described in FIGS. 3A-3E.

In FIGS. 1 and 3A-3E, there is no direct communication between the application server 112 and the first access control device 110a/the second access control device 110b. However, in another embodiment, the application server 112 may be configured to directly communicate with the first and second access control devices 110a and 110b. In such scenarios, any passcode generated and/or stored in the first access control device 110a and/or the second access control device 110b may be directly synchronized with the application server 112.

In FIGS. 3A-3E, the first passcode to the vehicle 106 is shared with a single user (e.g., the second user 102b). However, it will be apparent to those of skill in the art that the first passcode (e.g., access rights) may be shared with multiple users simultaneously without deviating from the scope of the disclosure.

In another embodiment, the service application 116 may be used by the first user 102a to raise a service request, for example, for cleaning the vehicle 106, for re-fueling the vehicle 106, for changing a flat tire of the vehicle 106, for charging a battery of the vehicle 106, or the like. In such a scenario, an intended recipient of the first passcode may not be specified by the first user 102a. The application server 112 may, based on the raised service request, select a service-provider (e.g., a car-cleaning service, a tire-replacement service, or the like) for addressing the service request. The selected service-provider (e.g., the selected second user 102b) may be registered with the application server 112 for the key-sharing service. The application server 112 may then present the selected service-provider to the first user 102a on the first user device 104a. The selected service-provider may then be approved by the first user 102a. In such a scenario, the application server 112 may receive a user approval message from the first user device 104a indicating that the selected service-provider is approved for the access to the vehicle 106. Further, the application server 112 may determine (e.g., identify) the user device associated with the selected service-provider for communicating the set of access credentials. The service-provider may access the vehicle 106, using the set of access credentials, and service the vehicle 106 as per the service request. Later, the set of access credentials may be deleted from the user device of the service-provider (as described in the foregoing description of FIG. 3E).

In another embodiment, a time-window (e.g., 5:15 pm-6: 00 pm) may be specified by the first user 102a, in addition to the access duration, when initiating the key-sharing request. In other words, the key-sharing request further indicates the time-window during which the access to the vehicle 106 is to be granted to the second user 102b. In such a scenario, the vehicle 106 may be accessed by the second user 102b only within the specified time-window. Thus, the application server 112 communicates the set of access credentials (e.g., the first passcode) to the second user device 104b at a start of the time-window.

In another embodiment, the key-sharing request may indicate that the second user 102b is to be granted periodic access (e.g., recurring access) to the vehicle 106. For example, the key-sharing request may indicate that the second user 102b is to be granted access rights to the vehicle 106 every Monday within a specified time-window (e.g., 5:15 pm-6:00 pm). In such a scenario, the vehicle 106 may be accessed by the second user 102b every Monday within the specified time-window. The first passcode may be shared with the second user device 104b every Monday at the start of the specified time-window. The access rights granted to the second user 102b may be revoked by the first user 102a at any time-instance.

In another embodiment, the access duration may elapse before the second user 102b exits the vehicle 106. In such a scenario, the service application 116, being executed on the second user device 104b, may delete the set of access credentials from the second user device 104b. In such a scenario, the RF signal transmitted by the second user device 104b may no longer include the first passcode, prompting the processor 118 to initiate the shutdown procedure.

In another embodiment, the access is granted to the second user 102b in such a manner that the vehicle 106 may be accessed by the second user 102b multiple times during the access duration. For example, if the second user device 104b moves beyond the detection range of the first access control device 110a accidentally or after successfully completing the access, and the access duration has not lapsed, the set of access credentials is not deleted from the second user device 104b. Thus, the vehicle 106 may be accessed again by the second user 102b once the second user device 104b is within the detection range of the first access control device 110a. In such cases, the set of access credentials is deleted from the second user device 104b exclusively on the lapse of the access duration. However, each time the second user device 104b moves beyond the detection range of the first access control device 110a, the control circuitry 120 may request the processor 118 to initiate the shutdown procedure.

In another embodiment, the previously-granted access rights of the second user 102b to the vehicle 106 may be revoked by the first user 102a. In such a scenario, an access revocation request may be initiated by the first user 102a by way of the service application 116 being executed on the first user device 104a. The access revocation request may indicate that access granted to the second user 102b is to be revoked. The service application 116 on the first user device 104a may communicate the access revocation request to the application server 112. The access revocation request may be initiated and communicated to the application server 112, before the vehicle 106 is accessed by the second user 102b or while the vehicle 106 is being accessed by the second user 102b. Based on the access revocation request, the application server 112 may communicate the access credentials deletion request to the service application 116 being executed on the second user device 104b. Based on the access credentials deletion request, the service application 116 may delete the set of access credentials from the second user device 104b, revoking access rights of the second user 102b to the vehicle 106. The service application 116 may display, on the display screen of the second user device 104b, a message indicating that the access of the second user 102b has been revoked by the first user 102a. Consequently, the service application 116 may communicate the access credentials deletion response to the application server 112. The application server 112 may communicate the access credentials deletion response to the first user device 104a, notifying the first user 102a of the revocation of the access rights of the second user 102b.

In another embodiment, the access duration may not be sufficient for the second user 102b to complete the task for which the second user 102b is granted access to the vehicle 106. In such a scenario, an extension of the access duration may be requested by the second user 102b, by way of the second user device 104b. In other words, the second user device 104b may generate an extension request to extend the access duration. The extension request may include an extension duration indicative of the extended time-period for which the vehicle 106 is to remain accessible to the second user 102b. For example, if the access duration is equal to "15" minutes, additional "10" minutes may be requested by the second user 102b to complete the task for which the second user 102b is granted the access. The application server 112 may be configured to receive the extension request from the second user device 104b and present the extension request to the first user 102a by way of the first user device 104a. The extension request may be approved or rejected by the first user 102a. For the sake of ongoing discussion, it is assumed that the extension request is approved by the first user 102a. In such a scenario, the application server 112 is further configured to receive an extension approval message from the first user device 104a in response to the extension request. The access duration is updated based on the extension duration. Thus, the first access control device 110a grants the second user 102b the access to the vehicle 106 for the updated access duration.

In another embodiment, the extension request may not include the extension duration. In such a scenario, the extension duration may be defined by the first user 102a by way of the first user device 104a while approving the extension request. In other words, the extension approval message includes the extension duration.

In a current embodiment, it is assumed that the access rights provided to the second user 102b may be absolute (e.g., the second user 102b is granted access to the vehicle 106 in entirety). In other words, when in possession of the first passcode, the second user 102b may, throughout the access the duration, have the same level of access to the vehicle 106 as the first user 102a. For example, the second user 102b may open doors of the vehicle 106, open the boot lid of the vehicle 106, open the lid of the charging port in the vehicle 106, make positional adjustments to electrically-powered seats in the vehicle 106, drive the vehicle 106, or the like.

However, in another embodiment, the vehicle 106 may be divided into multiple parts (e.g., the plurality of vehicular systems) and the first access control device 110a may generate multiple passcodes (e.g., secondary digital keys) that control access to the parts of the vehicle 106, respectively. In other words, each of the multiple passcodes is mapped to or associated with a unique set of access rights or access privileges. For example, one passcode may be a master passcode that allows a user to access all functionalities or components of the vehicle 106. Another passcode may be associated with a privilege to only open the boot lid of the vehicle 106. Another passcode may be associated with a privilege to open the boot lid and the doors of the vehicle 106. Another passcode may be associated with a privilege to open the boot lid of the vehicle 106, open the doors of the vehicle 106, and use the music system in the vehicle 106. Each of these passcodes may be synchronized between the first access control device 110a and the first user device 104a.

In such a scenario, during the initiation of the key-sharing request, a level of access to be provided to the second user 102b may be specified by the first user 102a. The key-sharing request may further include an access level indicating that the second user 102b is to be granted access to a specific part of the vehicle 106. Consequently, the application server 112 may select an appropriate passcode, from the multiple passcodes, to be communicated to the second user device 104b based on the access level. The vehicle 106 may be accessed by the second user 102b based on the passcode received from the application server 112. However, one or more functions in the vehicle 106 may be restricted to the second user 102b, based on the set of access rights or privileges associated with the passcode. For example, if the passcode communicated to the second user 102b is only associated with the right to open the boot lid of the vehicle 106, the doors of the vehicle 106 may not be unlocked for the second user 102b.

In another embodiment, access to the vehicle 106 may require an additional level of authentication (e.g., two-factor authentication). For example, the application server 112 may store therein user authentication data of a set of users (e.g., the first and second users 102a and 102b). In a non-limiting example, the user authentication data may include biometric data such as, but not limited to, face data of the set of users, fingerprint data of the set of users, iris data of the set of users, or the like. It will be apparent to those of skill in the art that the user authentication data is not limited to biometric data. The user authentication data may also include passwords or any other data that uniquely identifies a user (e.g., the second user 102b) such as, but not limited to, a driving license number of the user, a social security number of the user, or the like. Before the set of access credentials is communicated to a user device (e.g., the second user device 104b) of a user (e.g., the second user 102b), the application server 112 may communicate a user authentication request to the user device for obtaining user authentication data of the user.

Based on the received user authentication request, the service application 116 that is being executed on the user device (e.g., the second user device 104b) may prompt the user to enter corresponding user authentication data. In a non-limiting example, the service application 116 may prompt the user to direct the user device (e.g., a front camera of the user device) towards his face to enable the user device to capture an image of his face. The user device (e.g., the second user device 104b) may extract, from the captured image, face data of the face of the user. The user device may communicate, to the application server 112, a response to the received user authentication request. The response may include user authentication data (e.g., the extracted face data) of the user. The application server 112 may validate the user authentication data included in the response to authenticate the second user 102b. In other words, the application server 112 may compare the user authentication data, included in the received response, with the user authentication data of the user that is stored in the application server 112. Based on a successful validation of the user authentication data, the application server 112 may communicate the set of access credentials to the user device (e.g., the second user device 104b). However, if the validation of the user authentication data is unsuccessful, the application server 112 may not communicate the set of access credentials to the user device.

Alternatively, the application server 112 may communicate the set of access credentials to the user device (e.g., the second user device 104b) before the user (e.g., the second user 102b) is prompted, by the service application 116, to provide the user authentication data. The user authentication data may be validated by the application server 112 and/or the service application 116 being executed on the user device (e.g., the second user device 104b). Based on a successful validation of the user authentication data provided by the user, the user device may communicate the access request to the first access control device 110a (e.g., the first access control device 110a receives the access request from the user device). If the validation of the user authentication data provided by the user is unsuccessful, the user device may not communicate the access request to the first access control device 110a.

In another embodiment, the first access control device 110a (e.g., the control circuitry 120) may store therein the user authentication data of the set of users (e.g., the first and second users 102a and 102b). The first access control device 110a may receive user authentication data from the user (e.g., the second user 102b) when the user attempts to access the vehicle 106. The first access control device 110a may include a set of sensors (e.g., fingerprint sensors, image sensors, or the like) for receiving user authentication data from the user. The first access control device 110a may validate the received user authentication data to authenticate the user (e.g., the second user 102b).

If both the first passcode, included in the access request, and the received user authentication data are successfully validated, the control circuitry 120 may actuate the relay, powering on the processor 118. The processor 118 may provide the user access to the vehicle 106. The validation of the user authentication data may be performed before or after the validation of the first passcode included in the access request. If validation of one of the user authentication data of the user and the first passcode is unsuccessful, the user (e.g., the second user 102b) is denied access to the vehicle 106.

In another embodiment, the first access control device 110a may not include the set of sensors. In such a scenario, a user device (e.g., the second user device 104b) of the user (e.g., the second user 102b) may include the set of sensors. The user device may receive user authentication data (e.g., the biometric data) of the user. In such a scenario, the access request communicated, by the user device (e.g., the second user device 104b) to the first access control device 110a, may include the received user authentication data. Further, the synchronization of new passcodes between the first access control device 110a and the first user device 104a may be based on the validation of user authentication data of the first user 102a.

Figure 4A:
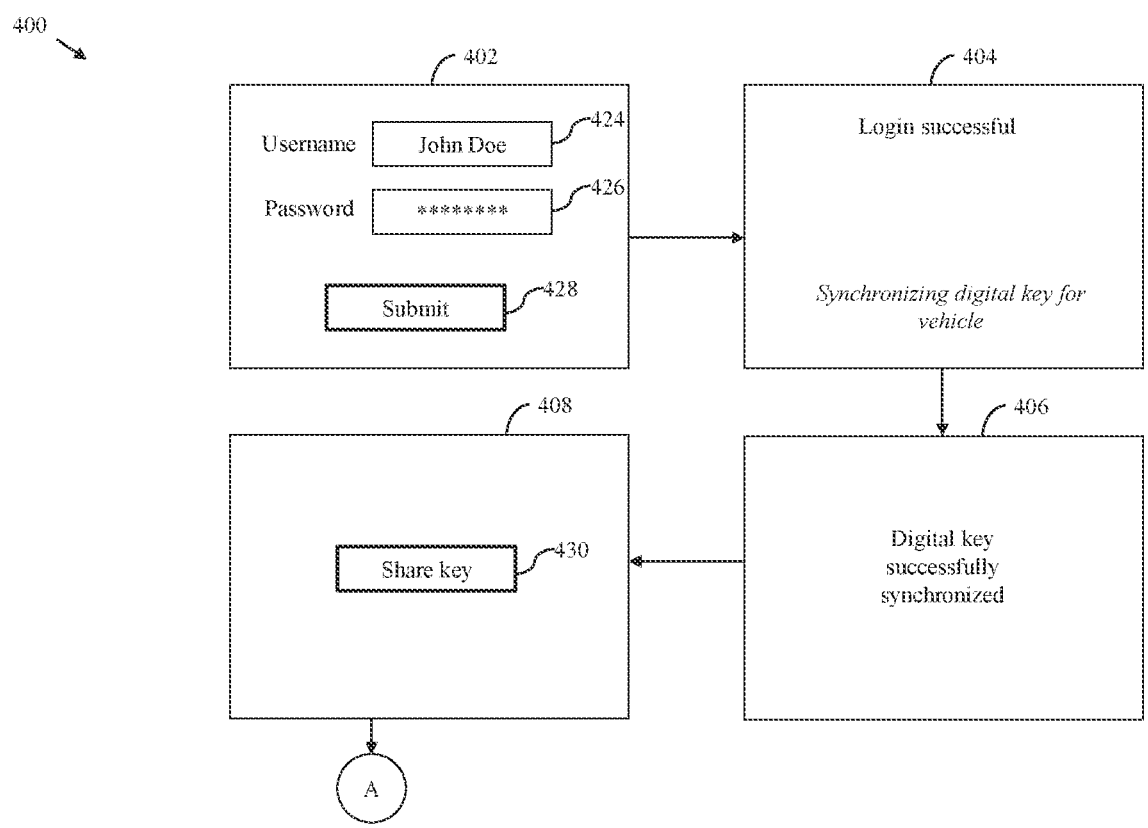
FIGS. 4A-4C are diagrams, which collectively, represents an exemplary scenario that illustrates user interface screens rendered on a user device of FIG. 1 for facilitating the cloud-based sharing of the digital keys, in accordance with an exemplary embodiment of the present disclosure.
Figure 4B:
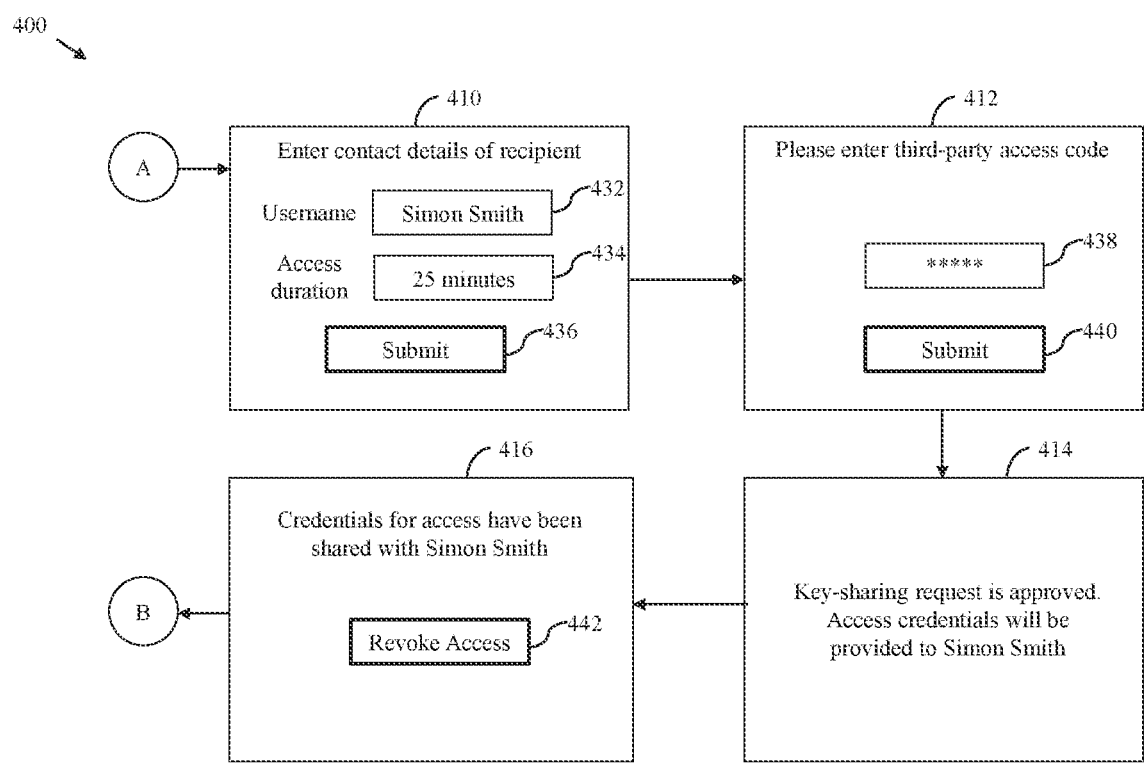
Figure 4C:
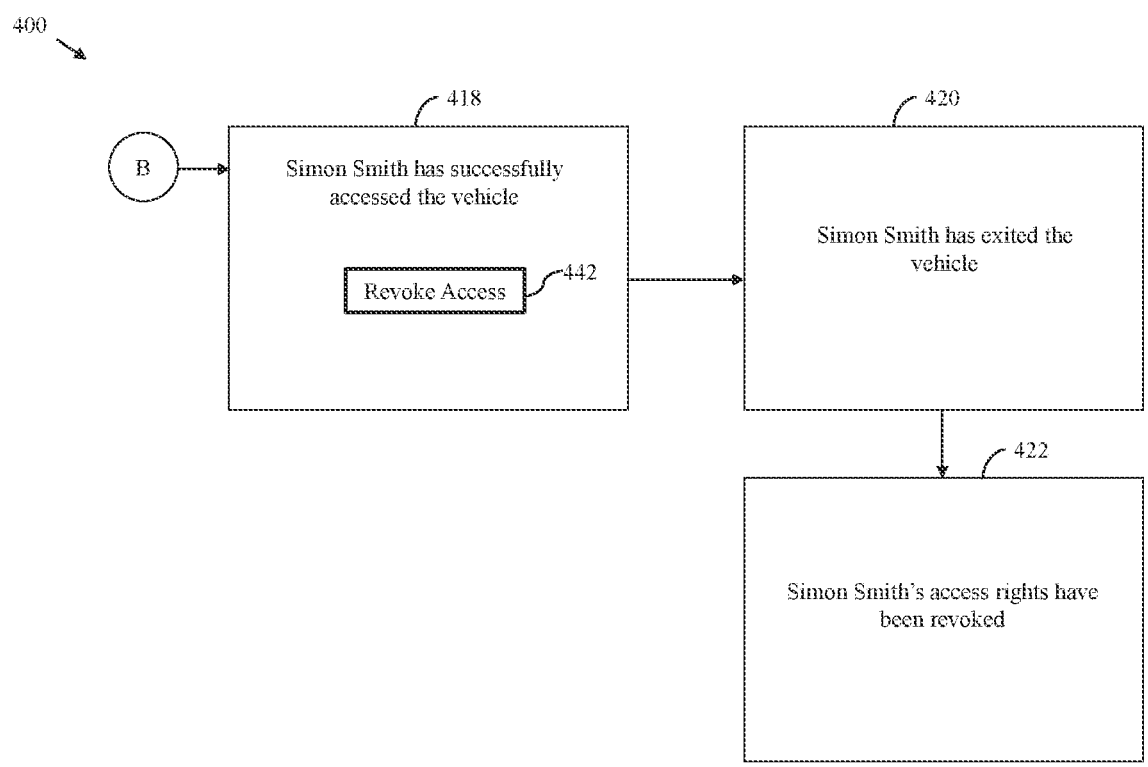

FIGS. 4A-4C, are diagrams, which collectively, represents an exemplary scenario 400 that illustrates user interface (UI) screens 402-422 rendered on the first user device 104a for facilitating the cloud-based sharing of the digital keys, in accordance with an exemplary embodiment of the present disclosure. FIGS. 4A-4C are explained in conjunction with FIGS. 1 and 3A-3E. The UI screens 402-422 are displayed on the display screen of the first user device 104a by the service application 116.

Referring to FIG. 4A, when the service application 116 on the first user device 104a is accessed by the first user 102a, the service application 116 may render the UI screen 402. The UI screen 402 may request the first user 102a to enter a username and a password to log into the service application 116. The first user 102a may enter his username and password (e.g., the login credentials of the first user 102a) in first and second text boxes 424 and 426, respectively. After entering the username (e.g., "John Doe") and the password (e.g., "********"), a first submit button 428 may be selected by the first user 102a for logging into the service application 116. The first user device 104a may communicate an authentication request to the application server 112 for authentication of the first user 102a. The authentication request may include the username and the password entered by the first user 102a.

The application server 112 may authenticate the first user 102a, by comparing the username and password, included in the authentication request, with the username and password stored in the database 214 (e.g., the username and password created at the time of registration). In a non-limiting example, it is assumed the first user 102a is successfully authenticated. Based on the authentication, the application server 112 may communicate an authentication response to the first user device 104a. The authentication response is indicative of the successful authentication of the first user 102a. Control is then redirected to the UI screen 404.

The UI screen 404 displays a message (e.g., "Login successful") indicating that the first user 102a has successfully logged into the service application 116. The service application 116 may communicate the first passcode, the first time-stamp, and the validity period to the application server 112. In other words, the service application 116 may facilitate synchronization, of the secondary digital key (e.g., the first passcode) of the vehicle 106, between the first user device 104a and the application server 112. Based on the communication of the first passcode, the first time-stamp, and the validity period, UI screen 404 displays another message (e.g., "Synchronizing digital key for vehicle") indicating that the first passcode for the vehicle 106 is being synchronized. Following the synchronization of the secondary digital key, control is redirected to the UI screen 406.

The UI screen 406 displays a message (e.g., "Digital key successfully synchronized), indicating that the secondary digital key (e.g., the first passcode) has been synchronized between the first user device 104a and the application server 112. Control is then redirected to the UI screen 408.

The UI screen 408 displays a first user-selectable option 430 (e.g., "Share key") for selection. The first user-selectable option 430 allows the first user 102a to initiate a request (e.g., the key-sharing request) for sharing the secondary digital key to the vehicle 106 with another user (e.g., the second user 102b). Based on the selection of the first user-selectable option 430 by the first user 102a, control is redirected to the UI screen 410.

Referring to FIG. 4B, the UI screen 410 requests the first user 102a to enter an identifier (e.g., username) of a user (e.g., recipient) with whom the secondary digital key to the vehicle 106 is to be shared. The UI screen 410 also prompts the first user 102a to set the access duration for the recipient. The first user 102a enters the username (e.g., "Simon Smith") of the second user 102b and the access duration (e.g., "25" minutes), in third and fourth text boxes 432 and 434, respectively. After entering the username of the second user 102b and the access duration, a second submit button 436 initiating the key-sharing request is selected by the first user 102a. When the key-sharing request is initiated, control is redirected to the UI screen 412.

The UI screen 412 displays a message, requesting the first user 102a to enter the third-party access code. The third-party access code may be entered by the first user 102a in a fifth text box 438. After entering the third-party access code (e.g., "****"), a third submit button 440 for generating the key-sharing request may be selected by the first user 102a. The service application 116 generates and communicates the key-sharing request to the application server 112. Based on the key-sharing request, the application server 112 communicates the key-sharing response to the first user device 104a. If the key-sharing response indicates that the key-sharing request is approved, control is redirected to the UI screen 414.

The UI screen 414 displays a message, indicating that the key-sharing request is approved and that access credentials for accessing the vehicle 106 would be provided to the second user 102b (e.g., "Simon Smith"). When the application server 112 notifies the service application 116 on the first user device 104a that the first passcode and the access duration have been communicated to the second user device 104b, control is redirected to the UI screen 416.

The UI screen 416 displays a message, indicating that the access credentials for accessing the vehicle 106 have been shared with Simon Smith. The UI screen 416 further displays a second user-selectable option 442 (e.g., "Revoke Access") that enables the first user 102a to initiate the access revocation request. If the second user-selectable option 442 is selected by the first user 102a, the service application 116 may communicate the access revocation request to the application server 112. However, in the current embodiment, the second user-selectable option 442 is not selected by the first user 102a. When the first user device 104a receives the access approval message from the application server 112, control is redirected to the UI screen 418.

Referring to FIG. 4C, the UI screen 418 displays a message indicating that the second user 102b has successfully gained access to the vehicle 106. The UI screen 418 further displays the second user-selectable option 442 (e.g., "Revoke Access"). In the current embodiment, the second user-selectable option 442 is not selected by the first user 102a. When the first user device 104a receives the vehicle exit notification from the application server 112, the UI screen 420 is rendered.

The UI screen 420 displays a message, indicating that the second user 102b has exited the vehicle 106. When the first user device 104a receives the access credentials deletion response from the application server 112, control is redirected to the UI screen 422.

The UI screen 422 displays a message, indicating that the set of access credentials that was shared with the second user 102b has been deleted from the second user device 104b (e.g., access rights of the second user 102b have been revoked).

Figure 5:
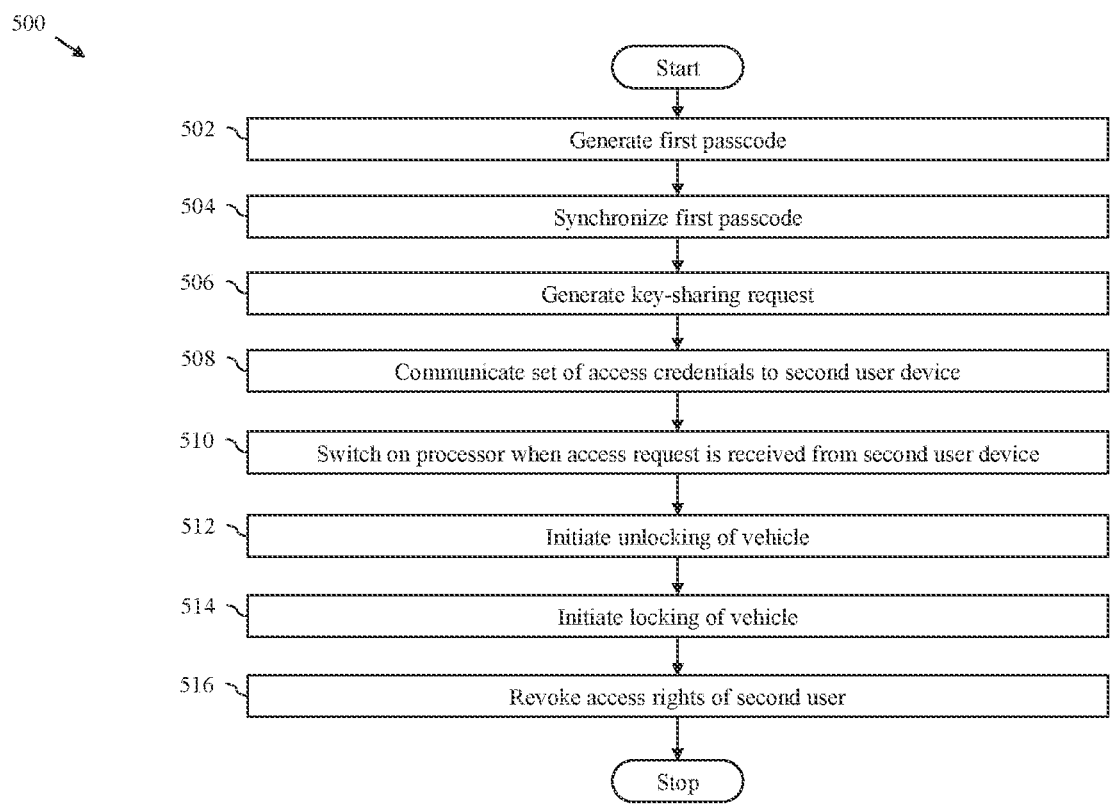
FIG. 5 is a flow chart that illustrates a method for facilitating the cloud-based sharing of the digital keys, in accordance with an exemplary embodiment of the present disclosure.

FIG. 5 is a flow chart 500 that illustrates the method for facilitating key-sharing between the first and second user devices 104a and 104b, in accordance with an exemplary embodiment of the present disclosure. FIG. 5 is explained in conjunction with FIGS. 3A-3E.

At 502, the first passcode is generated. The first passcode may be generated by the first access control device 110a, the first user device 104a, or the application server 112. At 504, the first passcode is synchronized. The first passcode may be synchronized between the first access control device 110a and the first user device 104a (as described in the foregoing description of FIGS. 1 and 3A). At 506, the key-sharing request is generated. The key-sharing request is generated at the first user device 104a, by the first user 102a, for sharing the first passcode with the second user 102b. The key-sharing request, as described in the foregoing description of FIG. 3B, includes the access duration and the identifier of the second user 102b. At 508, the set of access credentials is communicated to the second user device 104b. The application server 112 communicates the set of access credentials to the second user device 104b, based on the received key-sharing request.

After receiving the set of access credentials, the second user 102b, with the second user device 104b, approaches the vehicle 106. When the second user device 104b is within the threshold distance of the first access control device 110a, a connection between the second user device 104b and the control circuitry 120 is established. The second user device 104b provides the first passcode to the control circuitry 120. In other words, the second user device 104b communicates the access request to the control circuitry 120.

At 510, the processor 118 is switched on when the access request is received from the second user device 104b. The control circuitry 120 actuates the relay when the access request is received from the second user device 104b, moving the relay to the "CLOSED" position and switching on (e.g., powering on) the processor 118. At 512, the unlocking of the vehicle 106 is initiated. The processor 118 initiates the unlocking of the vehicle 106, as described in the foregoing description of FIG. 3D. The control circuitry 120 communicates the access approval message to the second user device 104b. Based on the access approval message, the second user 102b accesses (e.g., enters) the vehicle 106 and retrieves the item from the cabin of the vehicle 106. Consequently, the second user 102b exits the vehicle 106, closes the doors of the vehicle 106, and walks away. When the second user device 104b is beyond the threshold distance of the first access control device 110a, the second user device 104b is no longer connected to the first access control device 110a (e.g., the control circuitry 120). In other words, the control circuitry 120 does not detect the RF signal from the second user device 104b. The control circuitry 120 prompts or requests the processor 118 to initiate locking of the vehicle 106 (e.g., initiate the shutdown procedure). At 514, the locking of the vehicle 106 is initiated. The processor 118 initiates the locking of the vehicle 106 by initiating the shutdown procedure. Upon completion of the shutdown procedure, the control circuitry 120 actuates the relay, moving the relay to the "OPEN" position and, thereby, switching off the processor 118.

The service application 116 on the second user device 104b communicates the vehicle exit notification to the application server 112. At 516, the access rights of the second user 102b are revoked. The application server 112 revokes the access rights of the second user 102b to the vehicle 106, based on the vehicle exit notification. For revoking the access rights of the second user 102b, the application server 112 communicates the access credentials deletion request to the second user device 104b. The service application 116, on the second user device 104b, deletes the set of access credentials from the second user device 104b, based on the access credentials deletion request. The service application 116, then, communicates the access credentials deletion response to the application server 112. The application server 112 communicates the access credentials deletion response to the first user device 104a.

Various embodiments of the disclosure provide an access management system that includes the application server 112 and the first access control device 110a that controls the access to the vehicle 106. The application server 112 may be configured to receive, from the first user device 104a of the first user 102a, the key-sharing request to grant the second user 102b, that is different from the first user 102a, the access to the vehicle 106 associated with the first user 102a. The key-sharing request includes the access duration that is indicative of the time-period for which the vehicle 106 is to remain accessible to the second user 102b. The application server 112 may be further configured to determine, based on the key-sharing request, the digital key associated with the vehicle 106, and communicate, based on the identifier of the second user 102b, the digital key to the second user device 104b of the second user 102b. Based on the second user device 104b being within the detection range of the first access control device 110a, the first access control device 110a may be configured to receive the digital key from the second user device 104b and validate the digital key. The first access control device 110a may be further configured to grant, based on the validation of the digital key, the second user 102b the access to the vehicle 106 for the access duration.

The disclosed methods encompass numerous advantages. The disclosed methods describe sharing, among users, of secondary digitals keys to access assets such as vehicles (e.g., the vehicle 106), facilities (e.g., the facility 108), safe lockers, or the like. The key-sharing enables a user to share a key to an asset with another user, even when the user (e.g., the first user 102a) is at a remote location away from the asset and the other user (e.g., the second user 102b). This provides a high level of convenience to a user who may wish to provide another user temporary access to his or her asset. Any digital key (e.g., the first passcode) that is shared between user devices (e.g., the first and second user devices 104a and 104b) is a secondary digital key that is periodically updated or changed. The secondary digital key expires when a validity period associated with the secondary digital key elapses. Thus, the asset is accessible to the other user (e.g., the second user 102b) by way of the associated user device (e.g., the second user device 104b) exclusively for a limited period of time. Further, any primary digital keys (e.g., the set of primary digital keys) associated with the asset (e.g., the vehicle 106) are not shared. This limits a risk of sharing keys with other users. The disclosed methods enable a user to set an access duration (e.g., "25" minutes) and a level of access privilege when sharing a key with another user, thereby further reducing the risk of sharing keys. Access credentials (e.g., the set of access credentials) that are shared with a recipient (e.g., the second user 102b) may be deleted when the recipient exits the asset, when an access duration set for the recipient lapses, or when a user or owner of the asset raises an access revocation request. Therefore, a comprehensive hardware and software solution is provided for enabling risk-free sharing of digital keys.

Techniques consistent with the disclosure provide, among other features, systems and methods for facilitating key-sharing between user devices. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. An access management system, comprising:
   a server configured to receive, from a first user device of a first user, a key-sharing request to grant a second user, that is different from the first user, an access to an asset associated with the first user, wherein the key-sharing request comprises an access duration that is indicative of a time-period for which the asset is to remain accessible to the second user, and wherein based on the key-sharing request, the server is further configured to:
   determine a digital key associated with the asset, wherein the digital key is determined based on the received key-sharing request; and
   communicate, over a communication network, the digital key to a second user device of the second user; and
   an access control device configured to control the access to the asset, wherein the access control device is configured to:
   synchronize the digital key with the first user device based on the first user device being within a detection range of the access control device, wherein the digital key is synchronized prior to the server receiving the key-sharing request from the first user device, wherein based on the second user device being within the detection range of the access control device, the access control device is further configured to:
   receive the digital key from the second user device;
   validate the digital key; and
   grant, based on the validation of the digital key, the second user the access to the asset for the access duration.

2. The access management system of claim 1, wherein the access control device comprises:
   a processor configured to control the access to the asset, wherein the asset is inaccessible when the processor is deactivated;
   a power source; and
   control circuitry coupled to the processor and the power source, wherein the control circuitry is configured to:
   receive the digital key from the second user device;
   validate the digital key; and
   activate the processor based on the validation of the digital key, wherein the control circuitry activates the processor by coupling the processor to the power source, wherein based on the activation, the processor is further configured to grant the second user the access to the asset, and wherein the access to the asset corresponds to unlocking the asset.

3. The access management system of claim 2, wherein based on the granted access, the control circuitry is further configured to periodically poll the second user device for the digital key, wherein based on a halt in the reception of the digital key from the second user device, the control circuitry is further configured to communicate a shutdown message to the processor, and wherein the processor is further configured to initiate, based on the shutdown message, a shutdown procedure to lock the asset.

4. The access management system of claim 3, wherein the control circuitry is further configured to deactivate the processor based on completion of the shutdown procedure, and wherein the control circuitry deactivates the processor by decoupling the processor from the power source.

5. The access management system of claim 2, wherein the asset comprises one or more components, wherein the processor is configured to control functioning of the one or more components of the asset to control the access to the asset, and wherein the processor controls the functioning of the one or more components by way of a set of digital keys that is different from the digital key received from the second user device.

6. The access management system of claim 1, wherein the key-sharing request further comprises an access code associated with the first user, wherein the server is further configured to validate the key-sharing request based on the access code, and wherein the server communicates the digital key to the second user device based on the validation of the key-sharing request.

7. The access management system of claim 1, wherein the key-sharing request further indicates a time-window during which the access to the asset is to be granted to the second user, and wherein the server communicates the digital key to the second user device at a start of the time-window.

8. The access management system of claim 1, wherein the server is further configured to communicate an access credentials deletion request to the second user device, wherein the server communicates the access credentials deletion request based on at least one of a group consisting of (i) a lapse of the access duration, (ii) an access revocation request generated by the first user device to indicate that the access granted to the second user is to be revoked, and (iii) a notification generated by the second user device to indicate that the asset is successfully accessed by the second user and a distance between the second user device and the access control device is greater than the detection range after successfully accessing the asset, and wherein based on the access credentials deletion request, the digital key is deleted from the second user device, thereby revoking the access of the second user to the asset.

9. The access management system of claim 1, wherein the server is further configured to:
   receive, from the second user device, an extension request to extend the access duration;
   present the extension request to the first user by way of the first user device; and
   receive, from the first user device in response to the extension request, an extension approval message indicating that the extension request is approved, wherein the access duration is updated based on an extension duration indicative of an extended time-period for which the asset is to remain accessible to the second user, wherein at least one of a group consisting of the extension request and the extension approval message comprises the extension duration, and wherein the access control device grants the second user the access to the asset for the updated access duration.

10. The access management system of claim 1, wherein when the access to the asset is granted to the second user, the first user device is beyond the detection range of the access control device.

11. The access management system of claim 1, wherein based on the digital key, the second user is granted access to the asset in entirety.

12. The access management system of claim 1, wherein the asset is divided into a plurality of parts, wherein an access to the plurality of parts is controlled by way of a plurality of digital keys, respectively, wherein the key-sharing request further comprises an access level indicating that the second user is to be granted access to a first part of the asset, and wherein the server is further configured to select, from the plurality of digital keys based on the access level, the digital key that is associated with the first part of the asset.

13. The access management system of claim 1, wherein the server is further configured to:
communicate a user authentication request to the second user device;
receive, as a response to the user authentication request, user authentication data associated with the second user; and
validate the user authentication data to authenticate the second user, wherein based on the validation of the user authentication data, the server communicates the digital key to the second user device or the access control device receives the digital key from the second user device.

14. The access management system of claim 1, wherein the access control device is further configured to:
receive, based on an attempt of the second user to access the asset, user authentication data associated with the second user; and
validate the user authentication data to authenticate the second user, wherein the access control device grants the second user the access to the asset further based on the validation of the user authentication data.

15. The access management system of claim 1,
wherein, prior to the server receiving the key-sharing request from the first user device, the digital key is synchronized between the first user device and the access control device based on the first user device being within the detection range of the access control device,
wherein the server is further configured to receive, from the first user device, a first time-stamp indicative of a time-instance at which the digital key is synchronized between the first user device and the access control device and a validity period of the digital key,
wherein when the key-sharing request is received, the server is further configured to determine, based on the validity period and the first time-stamp, a remaining validity of the digital key and compare the access duration with the remaining validity of the digital key, and
wherein the server communicates the digital key to the second user device based on the remaining validity of the digital key being greater than the access duration by a pre-determined threshold.

16. The access management system of claim 1, wherein the access control device is further configured to generate the digital key, and wherein the server is further configured to receive the digital key from the first user device as a part of the key-sharing request or when the digital key is synchronized.

17. The access management system of claim 1, wherein the key-sharing request further comprises an identifier of the second user, and wherein the server is further configured to determine, based on the key-sharing request, the second user to whom the access is to be granted and the second user device associated with the second user.

18. The access management system of claim 1, wherein the server is further configured to:
select, based on the key-sharing request, the second user;
present the selected second user to the first user by way of the first user device;
receive a user approval message from the first user device indicating that the second user is approved for the access to the asset; and
determine the second user device associated with the second user for communicating the digital key.

19. An access management system, comprising:
a server configured to receive, from a first user device of a first user, a key-sharing request to grant a second user, that is different from the first user, an access to an asset associated with the first user, wherein the key-sharing request comprises an access duration that is indicative of a time-period for which the asset is to remain accessible to the second user, and wherein based on the key-sharing request, the server is further configured to:
determine a digital key associated with the asset based on the received key sharing request, wherein the digital key is generated by the first user device; and
communicate, over a communication network, the digital key to a second user device of the second user; and
an access control device configured to:
receive, based on the first user device being within a detection range of the access control device, the digital key from the first user device to synchronize the digital key therebetween,
wherein the digital key is synchronized between the first user device and the access control device prior to the server receiving the key-sharing request from the first user device,
wherein the server is further configured to receive the digital key from the first user device as a part of the key-sharing request or when the digital key is generated by the first user device, and
wherein based on the second user device being within the detection range of the access control device, the access control device is further configured to:
receive the digital key from the second user device;
validate the digital key; and
grant, based on the validation of the digital key, the second user the access to the asset for the access duration.

20. An access management system, comprising:
a server configured to:
generate a digital key;
communicate the digital key to a first user device of a first user; and receive, from the first user device, a key-sharing request to grant a second user, that is different from the first user, an access to an asset associated with the first user, wherein the key-sharing request comprises an access duration that is indicative of a time-period for which the asset is to remain accessible to the second user, and wherein based on the key-sharing request, the server is further configured to:

communicate, over a communication network, the digital key to a second user device of the second user; and an access control device configured to control the access to the asset, wherein the access control device is further configured to:

receive, based on the first user device being within a detection range of the access control device, the digital key from the first user device to synchronize the digital key therebetween, wherein the digital key is synchronized between the first user device and the access control device prior to the server receiving the key-sharing request from the first user device, and wherein based on the second user device being within the detection range of the access control device, the access control device is further configured to:

receive the digital key from the second user device;

validate the digital key; and grant, based on the validation of the digital key, the second user the access to the asset for the access duration.

* * * * *